US007893905B2

(12) United States Patent
Kim et al.

(10) Patent No.: US 7,893,905 B2
(45) Date of Patent: Feb. 22, 2011

(54) APPARATUS AND METHOD FOR DRIVING LIQUID CRYSTAL DISPLAY DEVICE

(75) Inventors: Seong Gyun Kim, Gunpo-Si (KR); Nam Yong Kong, Seongnam-Si (KR)

(73) Assignee: LG Display Co., Ltd., Seoul (KR)

( * ) Notice: Subject to any disclaimer, the term of this patent is extended or adjusted under 35 U.S.C. 154(b) by 1049 days.

(21) Appl. No.: 11/638,539

(22) Filed: Dec. 14, 2006

(65) Prior Publication Data
US 2007/0182687 A1 Aug. 9, 2007

(30) Foreign Application Priority Data
Feb. 9, 2006 (KR) .................. 10-2006-0012637

(51) Int. Cl.
G09G 3/36 (2006.01)
(52) U.S. Cl. .................. 345/89; 345/98; 345/690
(58) Field of Classification Search ........... 345/87–102, 345/204, 690
See application file for complete search history.

(56) References Cited
U.S. PATENT DOCUMENTS

| 5,146,328 A * | 9/1992 | Yamasaki et al. ........... 348/675 |
| 2005/0104827 A1 | 5/2005 | Baik |
| 2005/0104837 A1 | 5/2005 | Baik et al. |
| 2005/0259739 A1* | 11/2005 | Nakamura et al. ..... 375/240.16 |
| 2007/0057895 A1* | 3/2007 | Kong et al. .................. 345/98 |
| 2007/0097058 A1* | 5/2007 | Kim et al. .................. 345/98 |
| 2007/0132683 A1* | 6/2007 | Kong ........................ 345/87 |
| 2007/0171218 A1* | 7/2007 | Hong et al. ................ 345/211 |

FOREIGN PATENT DOCUMENTS

| DE | 10 2004 062 529 A1 | 7/2005 |
| DE | 10 2006 029 710 A1 | 4/2007 |
| EP | 1 659 803 A1 | 5/2006 |
| JP | 4-213973 A | 8/1992 |
| JP | 5-22633 A | 1/1993 |
| JP | 7-199856 A | 8/1995 |
| JP | 10-333638 A | 12/1998 |
| JP | 2002-82657 A | 3/2002 |
| JP | 2002-191055 A | 7/2002 |

(Continued)

OTHER PUBLICATIONS

Haan et al., IEEE Transaction on Consumer Electronics, "An Overview of Flaws in Emerging Television Displays and Remedial Video Processing", vol. 47, No. 3, pp. 326-334, (Aug. 2001).

*Primary Examiner*—Stephen G Sherman
(74) *Attorney, Agent, or Firm*—Birch, Stewart, Kolasch & Birch, LLP

(57) ABSTRACT

An apparatus for driving a liquid crystal display device is provided. The apparatus includes a converter for detecting a motion vector from externally input source data, converting one frame of an input original image of the input source data into at least two conversion frames, filtering images of the at least two conversion frames according to the motion vector, and generating modulated data; a gate driver for supplying a scan signal to the gate lines; and a data driver for converting the modulated data into an analog video signal and supplying the analog video signal to the data lines.

46 Claims, 23 Drawing Sheets

FOREIGN PATENT DOCUMENTS

| | | |
|---|---|---|
| JP | 2002-351382 A | 12/2002 |
| JP | 2003-50574 A | 2/2003 |
| JP | 2003-345285 A | 12/2003 |
| JP | 2004-233949 A | 8/2004 |
| JP | 2005-43864 A | 2/2005 |
| JP | 2005-196108 A | 7/2005 |
| JP | 2006-337448 A | 12/2006 |
| WO | WO-03/100724 A3 | 12/2003 |

* cited by examiner

APPARATUS AND METHOD FOR DRIVING LIQUID CRYSTAL DISPLAY DEVICE

This Nonprovisional Application claims priority under 35 U.S.C. §119(a) on Patent Application No. 10-2006-0012637 filed in Korea on Feb. 9, 2006, the entire contents of which are hereby incorporated by reference.

BACKGROUND OF THE INVENTION

1. Field of the Invention

The present invention relates to a liquid crystal display device, and more particularly, to an apparatus and method for driving a liquid crystal display device which is capable of removing motion blurring of an image to improve image quality.

2. Discussion of the Related Art

In general, a liquid crystal display device displays an image by adjusting light transmittance of liquid crystal cells according to a video signal. An active matrix type liquid crystal display device in which a switching element is formed in each liquid crystal cell is suitable for displaying a moving image. As the switching element used in the active matrix type liquid crystal display device, a thin film transistor (hereinafter, referred to as "TFT") is generally used.

FIG. 1 is a schematic view showing an apparatus for driving a liquid crystal display device of the related art.

Referring to FIG. 1, the apparatus for driving the liquid crystal display device of the related art includes an image display unit 2 including liquid crystal cells which are formed in regions defined by n gate lines GL1 to GLn and m data lines DL1 to DLm, a data driver 4 for supplying an analog video signal to the data lines DL1 to DLm, a gate driver 6 for supplying a scan signal to the gate lines GL1 to GLn, and a timing controller 8 which aligns and supplies externally input data RGB to the data driver 4, generates a data control signal DCS to control the data driver 4, and generates a gate control signal GCS to control the gate driver 6.

The image display unit 2 includes a transistor array substrate and a color filter array substrate facing each other, spacers for uniformly maintaining a cell gap between these two array substrates, and liquid crystal materials filled in the gap provided by the spacers.

The image display unit 2 includes TFTs formed in regions defined by the n gate lines GL1 to GLn and the m data lines DL1 to DLm, and liquid crystal cells connected to the TFTs. The TFTs supply the analog video signal supplied from the data lines DL1 to DLm to the liquid crystal cells in response to the scan signal supplied from the gate lines GL1 to GLn. The liquid crystal cell includes a common electrode and a pixel electrode connected to the TFT with the liquid crystal interposed therebetween and thus may be equivalently expressed by a liquid crystal capacitor Clc. The liquid crystal cell further includes a storage capacitor Cst connected to a previous-stage gate line such that the analog video signal charged in the liquid crystal capacitor Clc is maintained until the next analog video signal is charged.

The timing controller 8 aligns and supplies the externally input data RGB according to the drive of the image display unit 2 to the data driver 4. In addition, the timing controller 8 generates the data control signal DCS and the gate control signal GCS using an externally input dot clock DCLK, a data enable signal DE, horizontal and vertical synchronization signals Hsync and Vsync, and controls the driving timing of the data driver 4 and the gate driver 6.

The gate driver 6 includes a shift register for sequentially generating the scan signal, that is, a gate high signal, in response to a gate start pulse GSP and a gate shift clock GSC in the gate control signal GCS supplied from the timing controller 8. The gate driver 6 sequentially supplies the gate high signal to the gate lines GL of the image display unit 2 and turns on the TFTs connected to the gate lines GL.

The data driver 4 converts the aligned data signal Data supplied from the timing controller 8 into the analog video signal according to the data control signal DCS supplied from the timing controller 8 and supplies the analog video signal of one horizontal line to the data lines DL for each one horizontal period that the scan signal is supplied to the gate lines GL. That is, the data driver 4 selects a gamma voltage having a predetermined level according to the data signal Data and supplies the selected gamma voltage to the data lines DL1 to DLm. At this time, the data driver 4 inverts the polarity of the analog video signal supplied to the data lines DL in response to a polarity control signal POL.

The apparatus for driving the liquid crystal display device of the related art has a slow response speed due to the properties such as inherent viscosity or elasticity of the liquid crystal. That is, the response speed of the liquid crystal varies depending on the physical properties and the cell gap of the liquid crystal material. Conventionally, a rising time is 20 to 80 ms and a falling time is 20 to 30 ms. Since such a response speed of the liquid crystal material is longer than a frame period (NTSC: 16.67 ms) of a moving image, it progresses to the next frame before the voltage charged in the liquid crystal cell reaches a desired voltage, as shown in FIG. 2.

Since the display image of each frame displayed on the image display unit 2 has influence on the display image of the next frame, motion blurring is generated in which the screen is blurred when displaying the moving image on the image display unit 2, due to the perception of a viewer.

Accordingly, in the apparatus and method for driving the liquid crystal display device of the related art, a contrast ratio deteriorates due to the motion blurring generated in the display image and thus image quality deteriorates.

In order to prevent the motion blurring generated in the liquid crystal display device of the related art, a high-speed driving apparatus for modulating a data signal for increasing the response speed of the liquid crystal was suggested.

FIG. 3 is a schematic block diagram showing the high-speed driving apparatus of the related art.

Referring to FIG. 3, the high-speed driving apparatus 50 of the related art includes a frame memory 52 for storing data RGB of an input current frame Fn, a look-up table 54 for comparing the data RGB of the input current frame Fn with data of a previous frame Fn-1 stored in the frame memory 52 and generating modulated data for increasing the response speed of the liquid crystal, and a mixer 56 for mixing the modulated data from the look-up table 54 with the data RGB of the current frame Fn and outputting the mixed data.

In the look-up table 54, the modulated data R'G'B' having a voltage larger than that of the input data RGB in order to increase the response speed of the liquid crystal to correspond to the gray level of the image, which is rapidly changed, is registered.

Since the high-speed driving apparatus 50 of the related art applies the voltage larger than an actual data voltage to the liquid crystal using the look-up table 54, as shown in FIG. 4, the liquid crystal more rapidly responds to a target gray voltage and, when reaching a desired gray level, the value is maintained.

Accordingly, the high-speed driving apparatus 50 of the related art as shown in FIG. 3 can reduce the motion blurring of the display image by increasing the response speed of the liquid crystal using the modulated data R'G'B'.

However, although the liquid crystal display device of the related art displays the image using the high-speed driving apparatus, the display image is not sharp due to the motion blurring generated in a boundary between the display images. That is, since brightness increases with a gradient in the boundary between the display images, the motion blurring is still generated although the liquid crystal is driven at a high speed.

SUMMARY OF THE INVENTION

Accordingly, the present invention is directed to an apparatus and method for driving a liquid crystal display device that substantially obviate one or more problems due to limitations and disadvantages of the related art.

An object of the present invention is to provide an apparatus and method for driving a liquid crystal display device, which is capable of removing motion blurring of an image to improve image quality.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving a liquid crystal display device including an image display unit including liquid crystal cells, a plurality of gate lines and a plurality of data lines, is provided. The apparatus includes a converter for detecting a motion vector from externally input source data, converting one frame of an input original image of the input source data into at least two conversion frames, filtering images of the at least two conversion frames according to the motion vector, and generating modulated data; a gate driver for supplying a scan signal to the gate lines; and a data driver for converting the modulated data into an analog video signal and supplying the analog video signal to the data lines.

In another aspect of the present invention, a method for driving a liquid crystal display device having an image display unit for displaying an image is provided. The method includes detecting a motion vector from externally input source data, converting one frame of an input original image into at least two conversion frames, filtering images of the at least two conversion frames according to the motion vector, and generating modulated data; supplying a scan signal to the gate lines; and converting the modulated data into an analog video signal in synchronization with the scan signal and supplying the analog video signal to the data lines.

In another aspect of the present invention, a converter for a driver of driving a liquid crystal display device, comprises: a first gamma correcting unit for gamma-correcting input source data in one frame and generating first data; a brightness/color separating unit for dividing the first data into a brightness component and a color component; and an image modulating unit for detecting the motion vector from the brightness component, converting the brightness component of the one frame into at least two conversion frames, and filtering the images of the at least two conversion frames according to the motion vector, and generating modulated brightness component based on the filtered images of the at least two conversion frames.

In another aspect of the present invention, a liquid crystal display device comprises an image display unit including liquid crystal cells, a plurality of gate lines and a plurality of data lines; a converter for detecting a motion vector from externally input source data, converting one frame of an input original image of the input source data into at least two conversion frames, filtering images of the at least two conversion frames according to the motion vector, and generating modulated data; a gate driver for supplying a scan signal to the gate lines; and a data driver for converting the modulated data into an analog video signal and supplying the analog video signal to the data lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
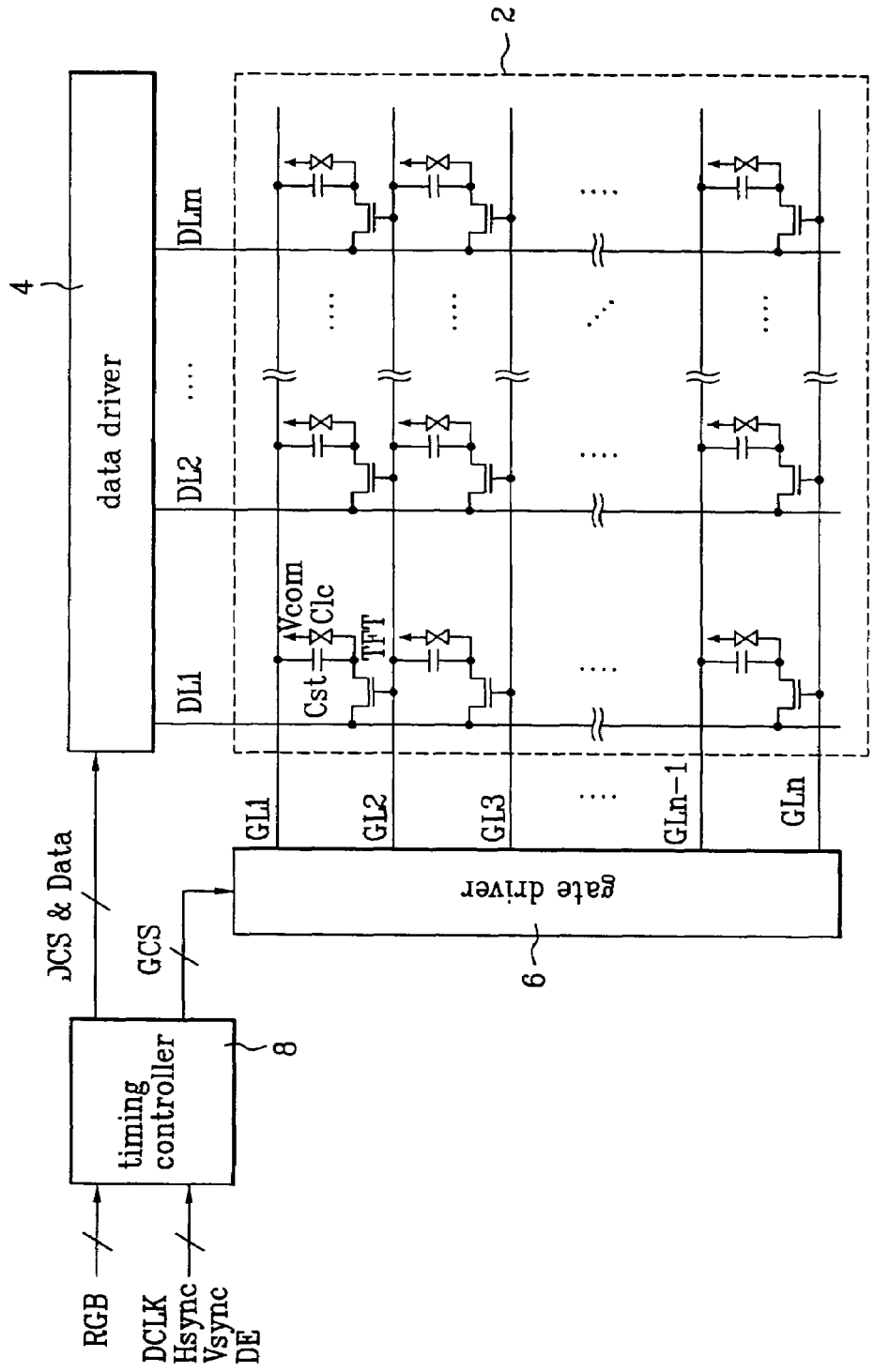
FIG. 1 is a schematic view showing an apparatus for driving a liquid crystal display device of the related art.
Figure 2:
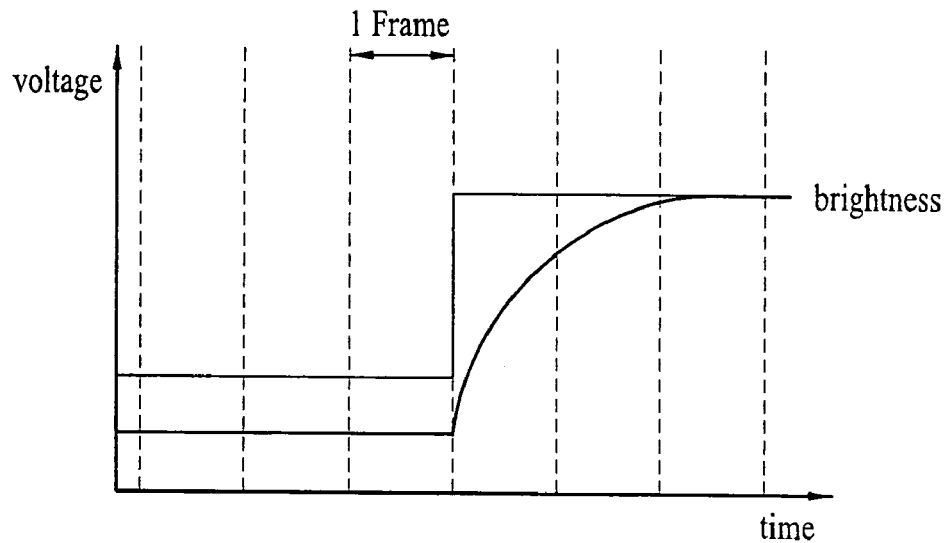
FIG. 2 is a view showing the response speed and the brightness of a liquid crystal cell shown in FIG. 1.
Figure 3:
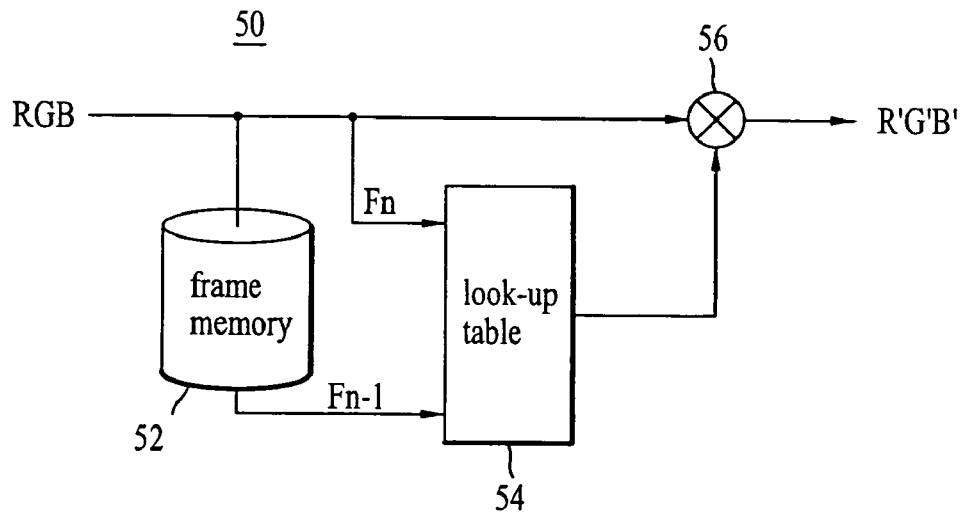
FIG. 3 is a schematic block diagram showing a high-speed driving apparatus of the related art.
Figure 4:
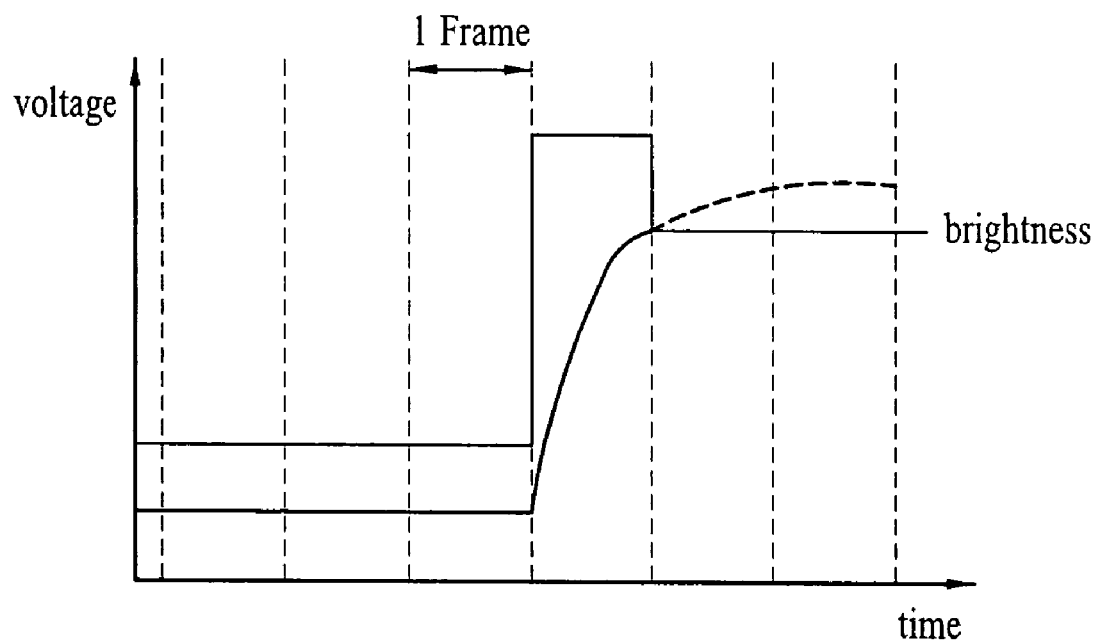
FIG. 4 is a view showing the response speed and the brightness of the liquid crystal cell in a case of using the high-speed driving apparatus shown in FIG. 3.
Figure 5:
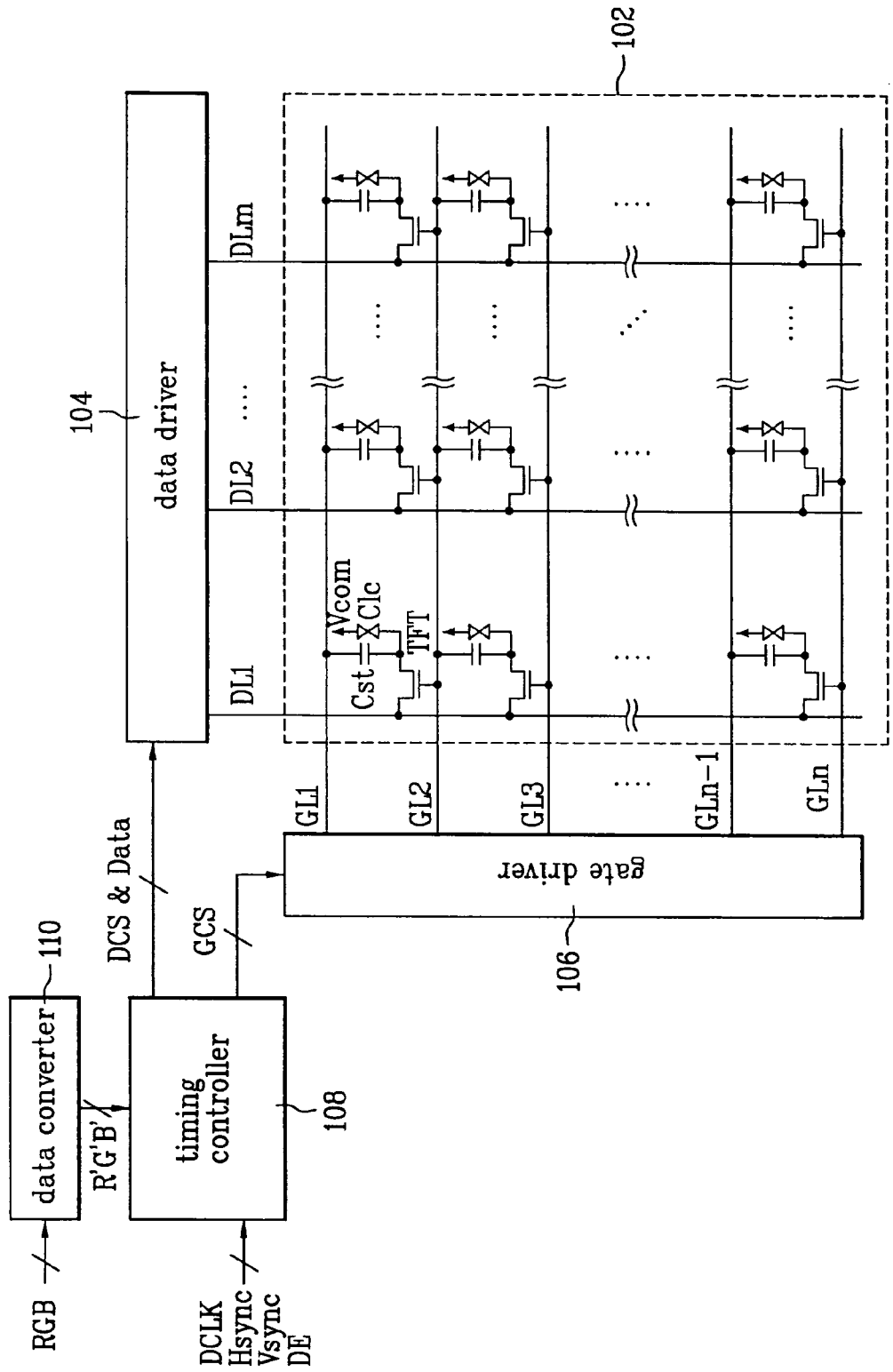
FIG. 5 is a schematic view showing an apparatus for driving a liquid crystal display device according to an embodiment of the present invention.

FIG. 5 is a schematic view showing an apparatus for driving a liquid crystal display device according to an embodiment of the present invention.

Referring to FIG. 5, the apparatus for driving the liquid crystal display device according to the embodiment of the present invention includes an image display unit 102 which includes liquid crystal cells formed in pixel regions defined by n gate lines GL1 to GLn and m data lines DL1 to DLm, a data converter 110 for detecting a motion vector from externally input source data RGB, converting one frame of an input original image into two conversion frames, filtering the images of the conversion frames converted by the motion vector, and generating the modulated data R'G'B', a gate driver 106 for supplying a scan signal to the gate lines GL1 to GLn, a data driver 104 for supplying an analog video signal to the data lines DL1 to DLm, a timing controller 108 for aligning modulated data R'G'B' supplied from the data converter 110 and supplying the aligned data signal Data to the data driver 104, generating a data control signal DCS to control the data driver 104, and generating a gate control signal GCS to control the gate driver 106.

The image display unit 102 includes a transistor array substrate and a color filter array substrate which face each other, spacers for uniformly maintaining a cell gap between the two array substrates, and liquid crystal filled in the gap provided by the spacers.

The image display unit 102 includes TFTs formed in regions defined by the n gate lines GL1 to GLn and the m data lines DL1 to DLm, and liquid crystal cells connected to the TFTs. The TFTs supply the analog video signal supplied from the data lines DL1 to DLm to the liquid crystal cell in response to the scan signal supplied from the gate lines GL1 to GLn. The liquid crystal cell includes a common electrode and a pixel electrode connected to the TFT with the liquid crystal interposed therebetween and thus may be equivalently expressed by a liquid crystal capacitor Clc. The liquid crystal cell further includes a storage capacitor Cst such that the analog video signal charged in the liquid crystal capacitor Clc is maintained until the next analog video signal is charged.

The data converter 110 detects a motion vector in a block unit and a motion vector in a pixel unit from the externally input source data RGB and detects a boundary from the display image.

The data converter 110 converts the source data RGB of one frame into two pieces of frame input data using a frequency multiplier (not shown). That is, when the source data RGB in a frame unit is supplied at a driving frequency of 60 Hz, the data converter 110 converts the source data RGB in the frame unit into data having a driving frequency of 120 Hz.

The data converter 110 filters a boundary between the moving display images in each frame input data according to a filtering coefficient corresponding to the detected motion vector such that an undershoot is generated in the boundary and/or the gradient of the boundary becomes smooth, generates the modulated data R'G'B', and supplies the generated modulated data R'G'B' to the timing controller 108.

The data converter 110 may be mounted or integrated in the timing controller 108.

The timing controller 108 aligns the modulated data R'G'B' to be appropriate for the driving of the image display unit 102 and supplies the aligned modulated data signal Data to the data driver 104.

In addition, the timing controller 108 generates the data control signal DCS and the gate control signal GCS using an externally input dot clock DCLK, a data enable signal DE, horizontal and vertical synchronization signals Hsync and Vsync and controls the driving timings of the data driver 104 and the gate driver 106.

The gate driver 106 includes a shift register for sequentially generating the scan signal, that is, a gate high signal, in response to a gate start pulse GSP and a gate shift clock GSC in the gate control signal GCS supplied from the timing controller 108. The gate driver 106 sequentially supplies the gate high signal to the gate lines GL of the image display unit 102 and turns on the TFTs connected to the gate lines GL.

The data driver 104 converts the aligned modulated data signal Data supplied from the timing controller 108 into the analog video signal according to the data control signal DCS supplied from the timing controller 108 and supplies the analog video signal of one horizontal line to the data lines DL for each one horizontal period that the scan pulse is supplied to the gate line GL. That is, the data driver 104 selects a gamma voltage having a predetermined level according to the data signal Data, generates the analog video signal, and supplies the selected analog video signal to the data lines DL1 to DLm. At this time, the data driver 104 inverts the polarity of the analog video signal supplied to the data lines DL in response to a polarity control signal POL.

According to the apparatus and method for driving the liquid crystal display device of the embodiment of the present invention, it is possible to remove motion blurring of a moving image by converting one frame of an input original image into two conversion frames, filtering a boundary between the moving display images of each of the two conversion frames converted according to the motion vector such that the gradient of the boundary becomes smooth and/or an undershoot is generated in the boundary, and generating the modulated data R'G'B'. Accordingly, the apparatus and method for driving the liquid crystal display device according to the embodiment of the present invention can make a moving display image sharper and stereoscopically display a still image without noise.

Figure 6:
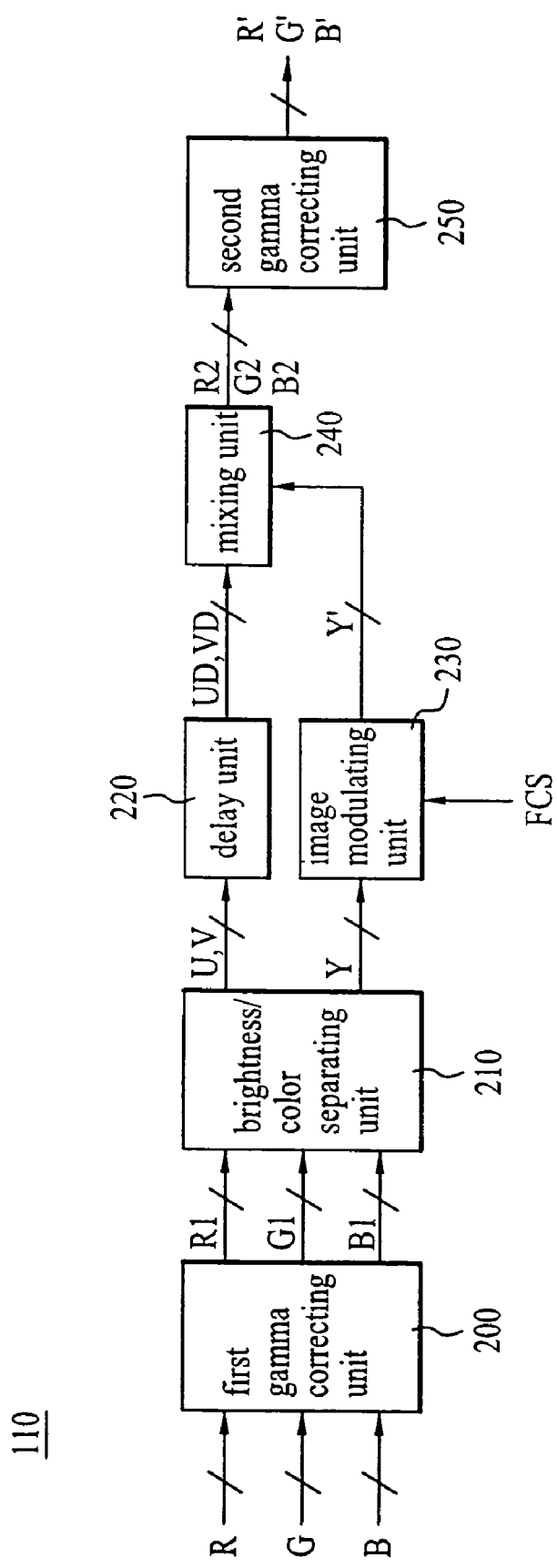
FIG. 6 is a schematic block diagram showing a data converter according to a first embodiment of the present invention shown in FIG. 5.

FIG. 6 is a schematic block diagram showing the data converter 110 according to a first embodiment of the present invention shown in FIG. 5.

Referring to FIGS. 5 and 6, the data converter 110 according to the first embodiment of the present invention includes a first gamma correcting unit 200, a brightness/color separating unit 210, a delay unit 220, an image modulating unit 230, a mixing unit 240, and a second gamma correcting unit 250.

The first gamma correcting unit 200 reverse-gamma corrects the source data RGB to first linear data R1, G1 and B1 as expressed by Equation 1. At this time, the first data R1, G1 and B1 become signals which are gamma-corrected in consideration of the output characteristics of a cathode ray tube.

$$R1=R^{\lambda}$$

$$G1=G^{\lambda}$$

$$B1=B^{\lambda} \qquad \text{Equation 1}$$

The brightness/color separating unit 210 divides the first data R1, G1 and B1 in a frame unit into a brightness component Y and color components U and V. The brightness component Y and the color components U and V are obtained by Equations 2 to 4.

$$Y=0.299 \times R1+0.587 \times G1+0.114 \times B1 \qquad \text{Equation 2}$$

$$U=0.493 \times (B1-Y) \qquad \text{Equation 3}$$

$$V=0.887 \times (R1-Y) \qquad \text{Equation 4}$$

The brightness/color separating unit 210 supplies the brightness component Y to the image modulating unit 230 and supplies the color components U and V to the delay unit 220.

While the image modulating unit 230 modulates the brightness component Y in the frame unit, the delay unit 220 delays the color components U and V in the frame unit to generate delayed color components UD and VD and supplies the delayed color components UD and VD to the mixing unit 240.

Figure 7:
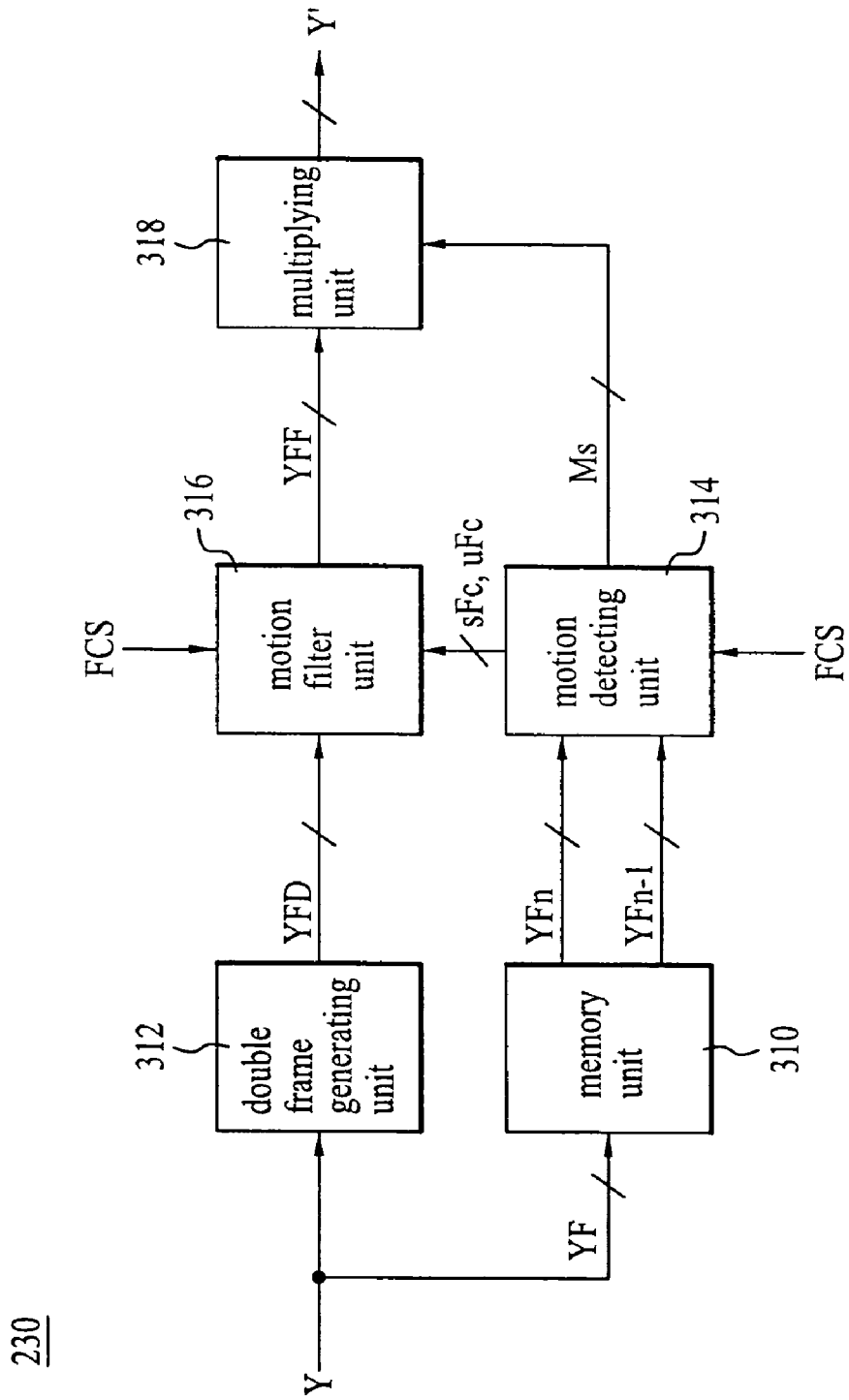
FIG. 7 is a schematic block diagram showing an image modulating unit according to first and second embodiments of the present invention shown in FIG. 6.

The image modulating unit 230 according to a first embodiment of the present invention includes a memory unit 310, a double frame generating unit 312, a motion detecting unit 314, a motion filter unit 316, and a multiplying unit 318, as shown in FIG. 7.

The memory unit 310 stores the brightness component YF in the frame unit supplied from the brightness/color separating unit 210. The memory unit 310 supplies a brightness component YFn of a current frame and a brightness component YFn-1 of a previous frame to the motion detecting unit 314.

The double frame generating unit 312 converts the brightness component Y of an original image in the frame unit supplied from the brightness/color separating unit 210 into first and second conversion frames YFD corresponding to the original image and sequentially supplies the converted first and second conversion frames YFD to the motion filter unit 316. The double frame generating unit 312 supplies the conversion frames having a driving frequency of 120 Hz to the motion filter unit 316 when the original image in the frame unit is supplied at a driving frequency of 60 Hz.

Figure 8:
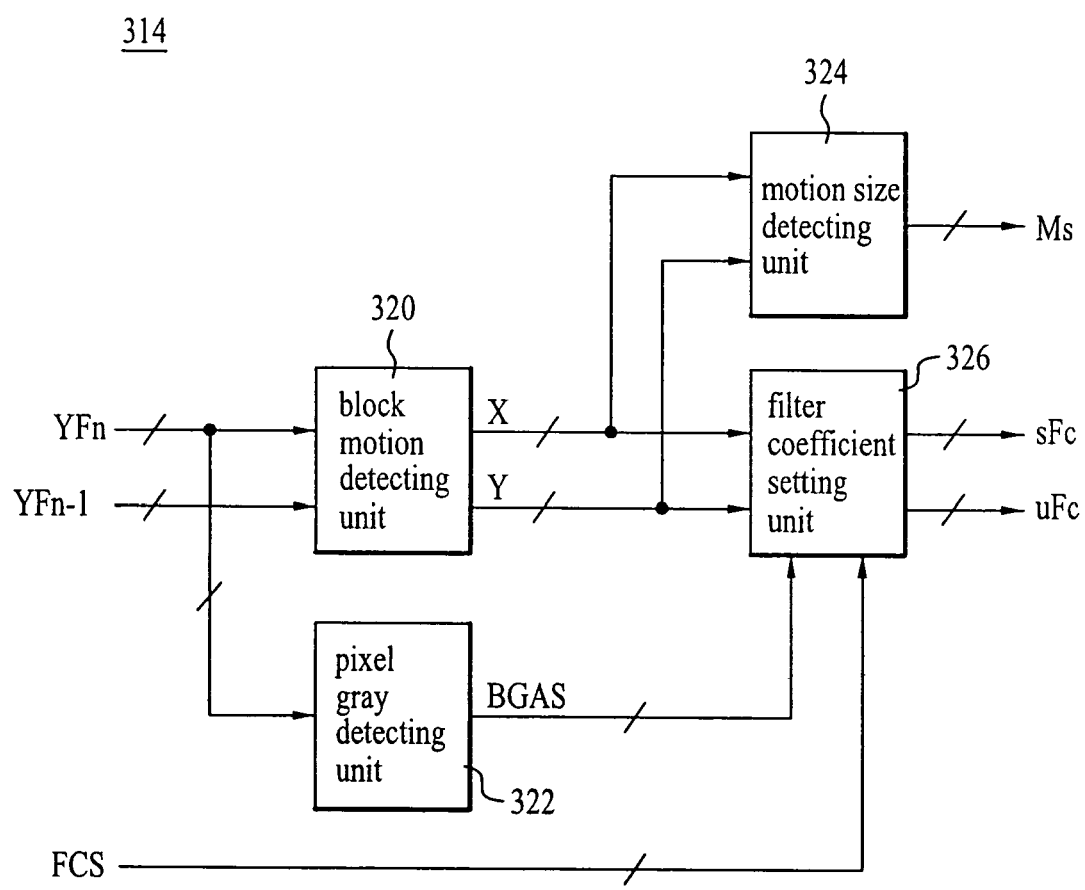
FIG. 8 is a schematic block diagram showing a motion detecting unit shown in FIG. 7.

The motion detecting unit 314 includes a block motion detecting unit 320, a pixel gray detecting unit 322, a motion size detecting unit 324, and a filter coefficient setting unit 326, as shown in FIG. 8.

The block motion detecting unit 320 compares the brightness component YFn of the current frame and the brightness component YFn-1 of the previous frame in an i×i block unit and detects motion vector X and Y including an x-axis displacement and a Y-axis displacement of a motion in the i×i block unit.

The pixel gray detecting unit 322 compares the brightness components YFn of pixels in the current frame and supplies a boundary gray level analysis signal BGAS to the filter coefficient setting unit 324. At this time, the pixel gray detecting unit 322 receives the brightness component YFn of the current frame in one horizontal line unit.

More specifically, the pixel gray detecting unit 322 compares the brightness components of adjacent pixels with each other, detects variation in the gray level of a pixel unit, and detects the boundary between the display images. The pixel gray detecting unit 322 supplies the boundary gray level analysis signal BGAS having a high level to the filter coefficient setting unit 326 when the gray level of the boundary is changed from a high gray to a low gray and supplies the boundary gray analysis signal BGAS having a low level to the filter coefficient setting unit 326 when the gray level of the boundary is changed from the high gray to the low gray.

The motion size detecting unit 324 detects a motion size signal Ms by Equation 5 using the motion vectors X and Y supplied from the block motion detecting unit 320 and supplies the motion size signal Ms to the multiplying unit 318. The motion size signal Ms is determined by the X-axis displacement and the Y-axis displacement of the motion and thus increases as the displacements are large.

$$Ms=\sqrt{X^2+Y^2} \qquad \text{Equation 5}$$

Figure 9:
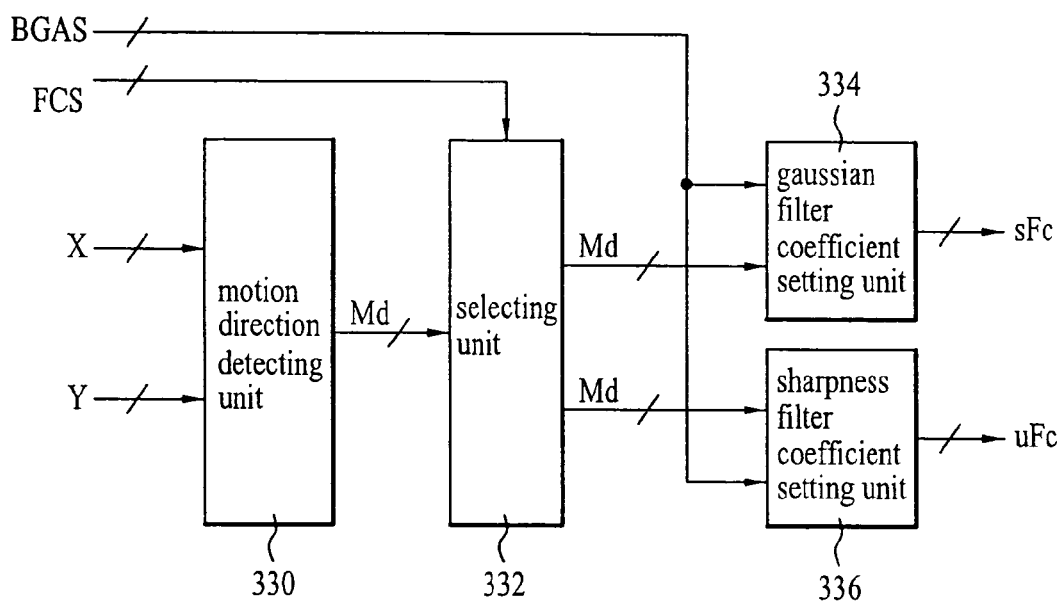
FIG. 9 is a schematic block diagram showing a filter coefficient setting unit shown in FIG. 8.

The filter coefficient setting unit 326 includes a motion direction detecting unit 330, a selecting unit 332, a Gaussian filter coefficient setting unit 334, and a sharpness filter coefficient setting unit 336, as shown in FIG. 9.

The motion direction detecting unit 330 detects a motion direction signal Md in the i×i block unit using the motion vectors X and Y and supplies the motion direction signal Md to the selecting unit 332. The motion direction signal Md in the i×i block unit is determined by any one of eight displacements including left side<->right side, upper side<->lower side, left upper corner<->right lower corner and left lower corner<->right upper corner.

Figure 10:
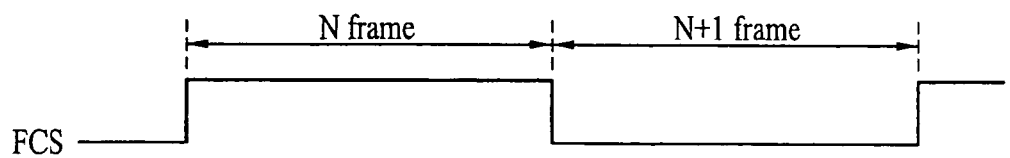
FIG. 10 is a waveform diagram showing a frame control signal according to a first embodiment of the present invention.

The selecting unit 332 supplies the motion direction signal Md supplied from the motion direction detecting unit 330 to the Gaussian filter coefficient setting unit 334 or the sharpness filter coefficient setting unit 336 according to a frame control signal FCS. The frame control signal FCS of an N$^{th}$ frame (or odd frame) of is in a high level and the frame control signal FCS of an N+1$^{th}$ frame (or even frame) is in a low level, as shown in FIG. 10.

The Gaussian filter coefficient setting unit 334 sets a Gaussian filter coefficient sFc for setting a gradient of the boundary between the moving display images in the motion direction Md according to the logic state of the boundary gray level analysis signal BGAS.

Figure 11A:
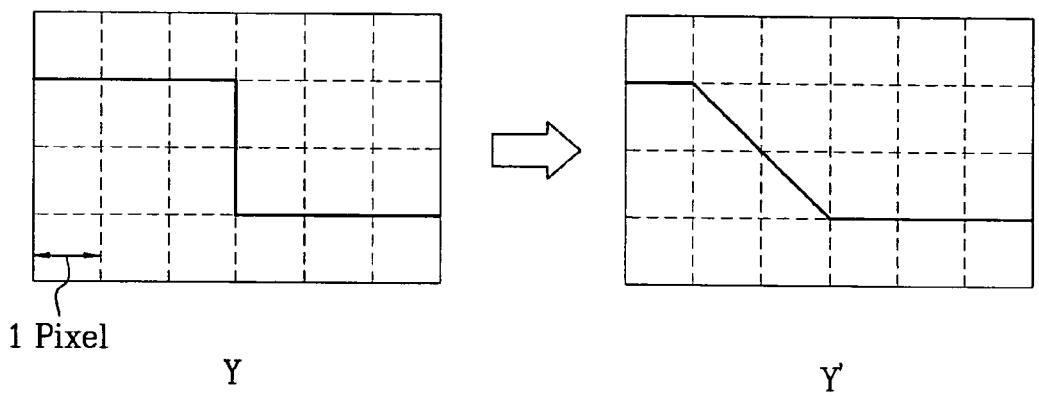
FIGS. 11A and 11B are waveform diagrams showing a boundary between moving display images upon Gaussian filtering according to an embodiment of the present invention.

More specifically, when the boundary gray level analysis signal BGAS is in the high level, the Gaussian filter coefficient setting unit 334 sets the Gaussian filter coefficient sFc such that the brightness components of two pixels before the boundary between the moving display images in the motion direction Md have a predetermined gradient, as shown in FIG. 11A.

Figure 11B:
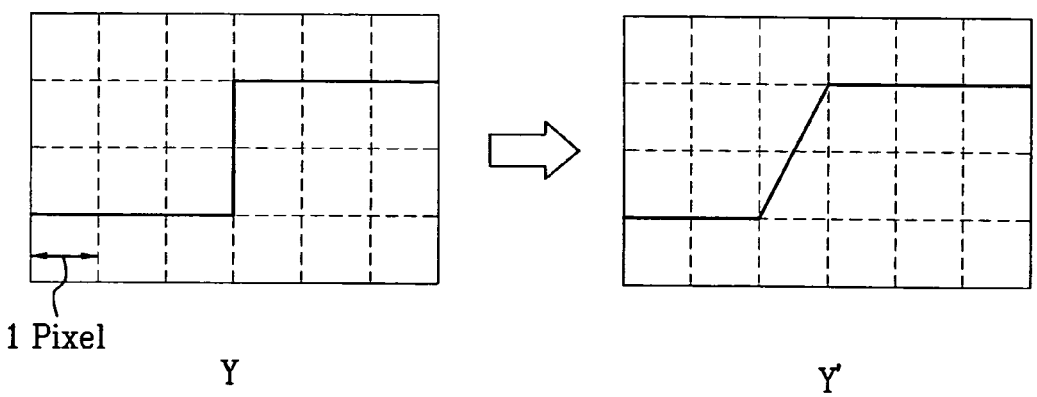

Meanwhile, when the boundary gray level analysis signal BGAS is in the low level, the Gaussian filter coefficient setting unit 334 sets the Gaussian filter coefficient sFc such that the brightness component of one pixel before the boundary between the moving display images in the motion direction Md has a predetermined gradient, as shown in FIG. 11B.

The Gaussian filter coefficient sFc may be set such that the brightness component of at least one pixel before or after the boundary between the moving display images in the motion direction Md has a predetermined gradient.

The sharpness filter coefficient setting unit 336 sets a sharpness coefficient uFc for generating an undershoot in the boundary between the moving display images in the motion direction Md according to the logic state of the boundary gray level analysis signal BGAS.

Figure 12A:
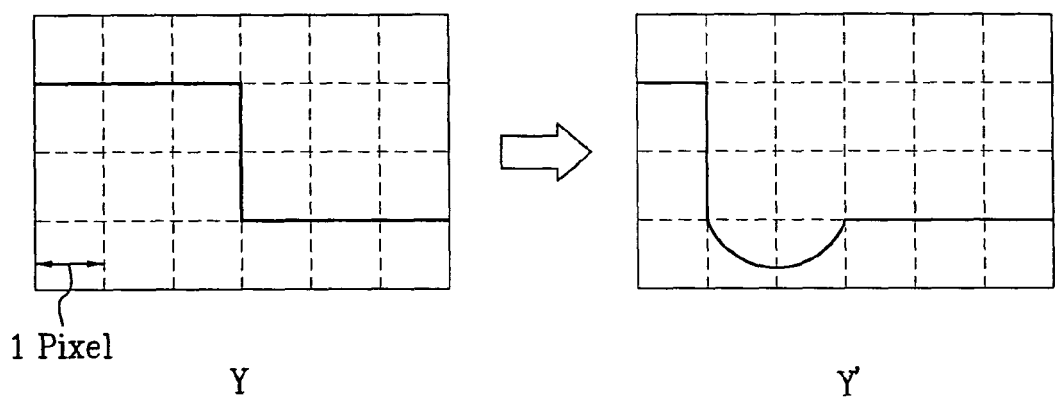
FIGS. 12A and 12B are waveform diagrams showing a boundary between moving display images upon sharpness filtering according to an embodiment of the present invention.

More specifically, when the boundary gray level analysis signal BGAS is in the high level, the sharpness filter coefficient setting unit 336 sets a sharpness filter coefficient uFc such that the undershoot is generated in the brightness components of two pixels before the boundary between the moving display images in the motion direction Md, as shown in FIG. 12A.

Figure 12B:
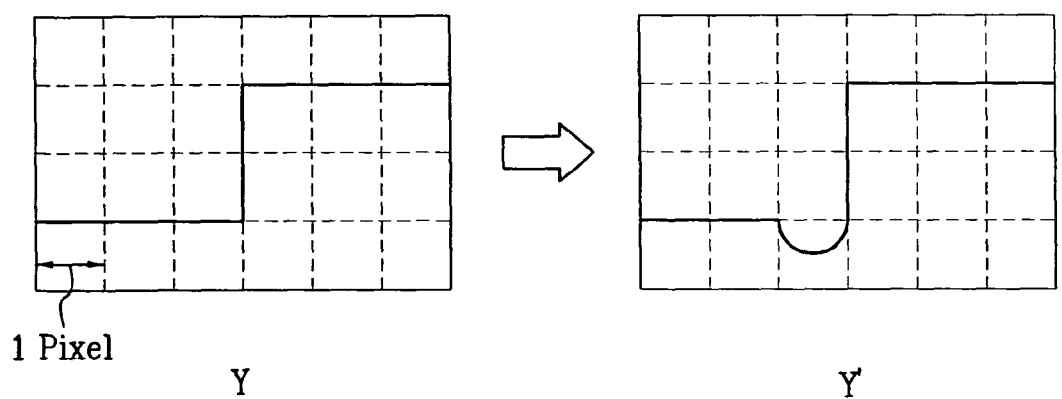

Meanwhile, when the boundary gray level analysis signal BGAS is in the low level, the sharpness filter coefficient setting unit 336 sets a sharpness filter coefficient uFc such that the undershoot is generated in the brightness component of one pixel before the boundary between the moving display images in the motion direction Md, as shown in FIG. 12B.

The sharpness filter coefficient uFc may be set such that the undershoot is generated in the brightness component of at least one pixel before or after the boundary between the moving display images in the motion direction Md.

In FIG. 7, the motion filter unit 316 filters the brightness component YFD of the conversion frame supplied from the double frame generating unit 312 using the Gaussian filter coefficient sFc or the sharpness filter coefficient uFc supplied from the motion detecting unit 314 according to the frame control signal FCS.

Figure 13:
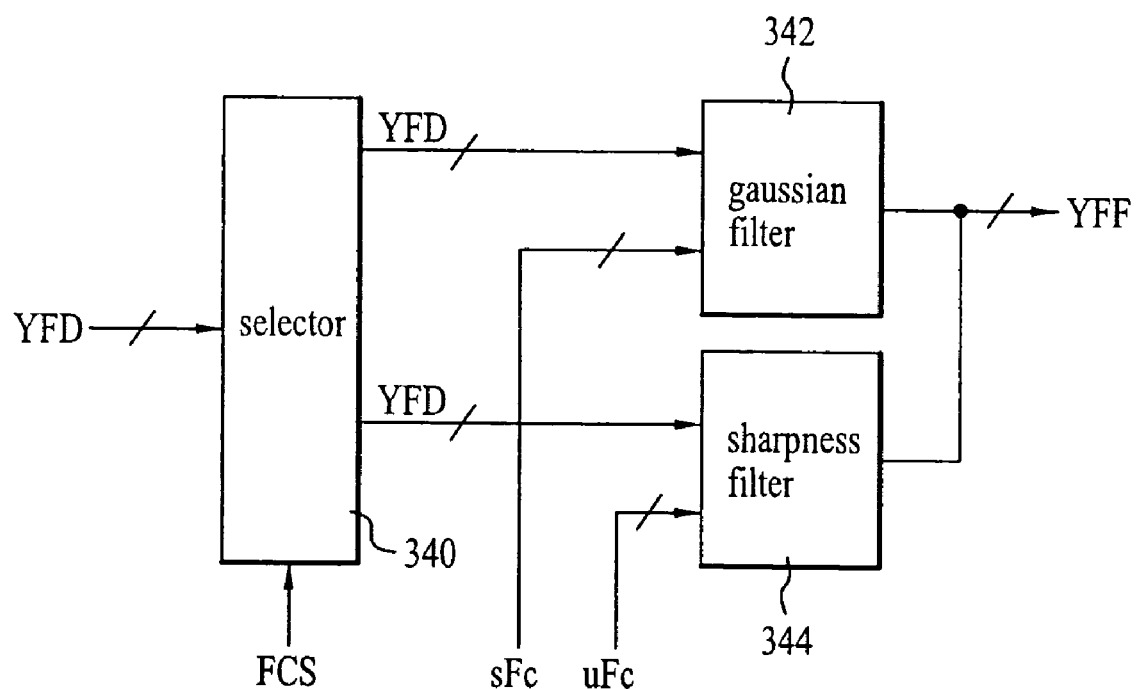
FIG. 13 is a schematic block diagram showing a motion filter unit according to first and second embodiments of the present invention shown in FIG. 6.

The motion filter unit 316 includes a selector 340, a Gaussian filter 342 and a sharpness filter 344, as shown in FIG. 13.

The selector 340 selectively outputs the brightness component YFD of the conversion frame according to the frame control signal FCS. That is, the selector 340 supplies the brightness component YFD of the conversion frame to the Gaussian filter 342 according to the frame control signal FCS having the high level and supplies the brightness component YFD of the conversion frame to the sharpness filter 344 according to the frame control signal FCS having the low level.

The Gaussian filter 342 filters the boundary between the moving display images in the brightness component YFD of an $N^{th}$ conversion frame supplied by the selecting unit 340 according to the Gaussian filter coefficient sFc and supplies the brightness component YFF of the filtered $N^{th}$ conversion frame to the multiplying unit 318. That is, the Gaussian filter 342 smoothly filters the boundary between the moving display image according to the Gaussian filter coefficient sFc to have a predetermined gradient, as shown in FIG. 11A or 11B.

The sharpness filter 344 filters the boundary between the moving display images in the brightness component YFD of an $N+1^{th}$ conversion frame supplied by the selecting unit 340 according to the sharpness filter coefficient uFc and supplies the brightness component YFF of the filtered $N+1^{th}$ conversion frame to the multiplying unit 318. That is, the sharpness filter 344 sharply filters the boundary between the moving display image according to the sharpness filter coefficient uFc, as shown in FIG. 12A or 12B.

In FIG. 7, the multiplying unit 318 multiplies the brightness component YFF of the filtered conversion frame by the motion size signal Ms according to the frame control signal FCS and supplies a modulated brightness component Y' of the conversion frame to the mixing unit 240. Accordingly, the boundary between the moving display images in the brightness component YFF of the filtered $N^{th}$ conversion frame has the gradient corresponding to the motion size signal Ms. The boundary between the moving display images in the brightness component YFF of the filtered $N+1^{th}$ conversion frame has the undershoot corresponding to the motion size signal Ms.

In FIG. 6, the mixing unit 240 mixes the modulated brightness component Y' supplied from the image modulating unit 230 with the color components UD and VD supplied from the delay unit 220 and generates second data R2, G2 and B2. The second data R2, G2 and B2 are obtained by Equations 6 to 8.

$R2 = Y' + 0.000 \times UD + 1.140 \times VD$  Equation 6

$G2 = Y' - 0.396 \times UD - 0.581 \times VD$  Equation 7

$B2 = Y' + 2.029 \times UD + 0.000 \times VD$  Equation 8

The second gamma correcting unit 250 gamma-corrects the second data R2, G2 and B2 supplied from the mixing unit 240 by Equation 9 to generate modulated data R'G'B'.

$R' = R2^{1/\lambda}$ $G' = G2^{1/\lambda}$ $B' = B2^{1/\lambda}$  Equation 9

The second gamma correcting unit 250 gamma-corrects the second data R2, G2 and B2 to generate the modulated data R'G'B' suitable for the driving circuit of the image display unit 102 using a look-up table and supplies the modulated data R'G'B' to the timing controller 108.

The image modulating unit 230 according to the first embodiment of the present invention converts one frame of the original image into the first and second conversion frame, filters the boundary between the moving display images of the first conversion frame such that the gradient of the boundary becomes smooth and generates the modulated data R'G'B', and filters the boundary between the display images of the second conversion frame such that the undershoot is generated and generates the modulated data R'G'B'.

Figure 14:
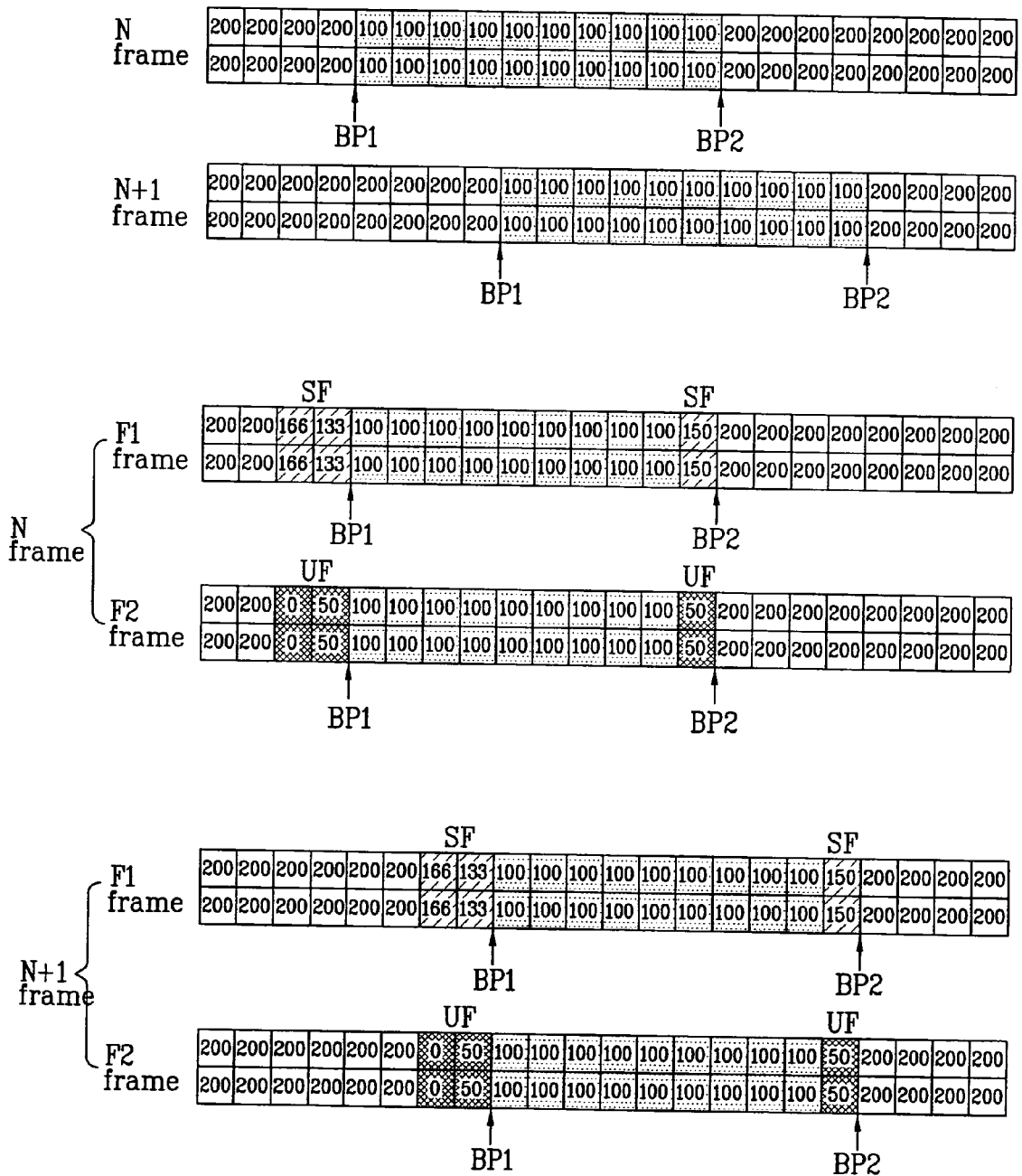
FIG. 14 is a view showing data modulated by the image modulating unit according to the first embodiment of the present invention.

For example, as shown in FIG. 14, when a rectangular image having a brightness component of 100 moves in a background image having a brightness component of 200 from the left side to the right side by four pixels, the image is modulated by the image modulating unit 230 as follows.

First, an $N^{th}$ frame image of the original image is displayed by the first and second conversion frames F1 and F2.

More specifically, in the first conversion frame F1 of the $N^{th}$ frame of the original image, a predetermined gradient is generated in boundaries BP1 and BP2 between the moving display images by the Gaussian filter coefficient sFc set according to the motion vector. In the second conversion frame F2 of the $N^{th}$ frame of the original image, the undershoot is generated in boundaries BP1 and BP2 between the moving display images by the sharpness filter coefficient uFc set according to the motion vector.

That is, in the first conversion frame F1 of the $N^{th}$ frame of the original image, the brightness components of two pixels before the first boundary BP1 are smoothly filtered (SF) when a high brightness component is changed to a low brightness component. When the low brightness component is changed to the high brightness component, the brightness component of one pixel before the second boundary BP2 is smoothly filtered (SF).

In the second conversion frame F2 of the N$^{th}$ frame of the original image, the brightness components of two pixels before the first boundary BP1 are sharply filtered (UF) when the high brightness component is changed to the low brightness component. When the low brightness component is changed to the high brightness component, the brightness component of one pixel before the second boundary BP2 is sharply filtered (UF).

In the first conversion frame F1 of the N+1$^{th}$ frame of the original image, a predetermined gradient is generated in boundaries BP1 and BP2 between the moving display images by the Gaussian filter coefficient sFc set according to the motion vector. In the second conversion frame F2 of the N+1$^{th}$ frame of the original image, an undershoot is generated in boundaries BP1 and BP2 between moving display images by the sharpness filter coefficient uFc set according to the motion vector.

That is, in the first conversion frame F1 of the N+1$^{th}$ frame of the original image, the brightness components of two pixels before the first boundary BP1 are smoothly filtered (SF) when the high brightness component is changed to the low brightness component. When the low brightness component is changed to the high brightness component, the brightness component of one pixel before the second boundary BP2 is smoothly filtered (SF).

In the second conversion frame F2 of the N+1$^{th}$ frame of the original image, the brightness components of two pixels before the first boundary BP1 are sharply filtered (UF) when the high brightness component is changed to the low brightness component. When the low brightness component is changed to the high brightness component, the brightness component of one pixel before the second boundary BP2 is sharply filtered (UF).

Accordingly, the image modulating unit 230 according to the first embodiment of the present invention can make the moving display image sharper and stereoscopically display a still image without noise.

The image modulating unit 230 according to a second embodiment of the present invention has the same configuration as that of the first embodiment of the present invention except the logic state of the frame control signal FCS.

Figure 15:
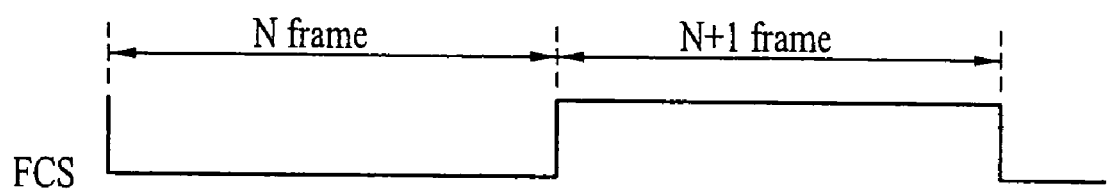
FIG. 15 is a waveform diagram showing a frame control signal according to a second embodiment of the present invention.

In the image modulating unit 230 according to the second embodiment of the present invention, the frame control signal FCS of an N$^{th}$ frame (or odd frame) is in the low level and the frame control signal FCS of an N+1$^{th}$ frame (or even frame) is in the high level, as shown in FIG. 15.

The image modulating unit 230 according to the second embodiment of the present invention converts one frame of the original image into first and second conversion frames, filters the boundary between the moving display images of the first conversion frame according to the motion vector such that the undershoot is generated in the boundary and generates modulated data R'G'B', and filters the boundary between the moving display images of the second conversion frame such that the gradient of the boundary becomes smooth and generates modulated data R'G'B'.

The image modulating unit 230 according to the second embodiment of the present invention can alternately perform smoothly and sharply filtering for the boundary between the moving display images when the logic state of the frame control signal FCS is inverted for each of a plurality of frames of the original image. For example, when the original image includes eight frames, each of the eight frames of the original image is converted into the first and second conversion frames FD1 and FD2, as shown in Table 1. In each of first to fourth frames of the original image, the first conversion frame FD1 is smoothly filtered (SF) and the second conversion frame FD2 is sharply filtered (UF). In contrast, in each of fifth to eight frames of the original image, the first conversion frame FD1 is sharply filtered (UF) and the second conversion frame FD2 is smoothly filtered (SF).

TABLE 1

| Original image | | | | | | | | | | | | | | | |
|---|---|---|---|---|---|---|---|---|---|---|---|---|---|---|---|
| First frame | | Second frame | | Third frame | | Fourth frame | | Fifth frame | | Sixth frame | | Seventh frame | | Eighth frame | |
| FD1 | FD2 | FD1 | FD2 | FD1 | FD2 | FD1 | FD2 | FD1 | FD2 | FD1 | FD2 | FD1 | FD2 | FD1 | FD2 |
| SF | UF | SF | UF | SF | UF | SF | UF | UF | SF | UF | SF | UF | SF | UF | SF |

Figure 16:
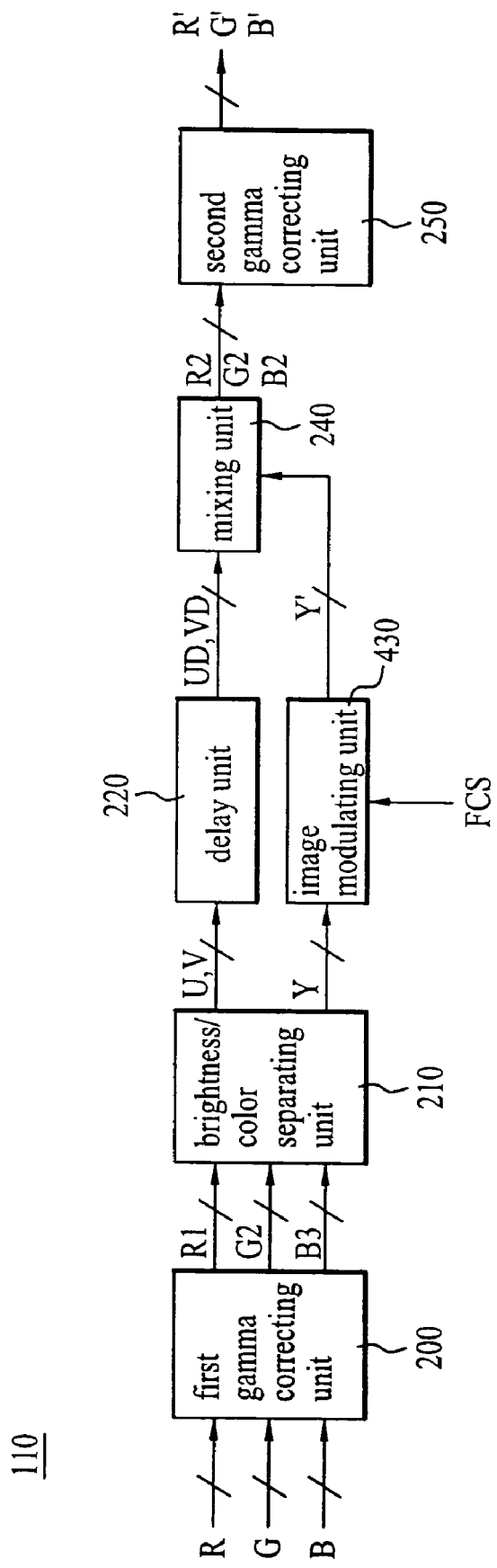
FIG. 16 is a schematic block diagram showing a data converter according to a second embodiment of the present invention shown in FIG. 5.

FIG. 16 is a schematic block diagram showing a data converter according to a second embodiment of the present invention.

Referring to FIGS. 16 and 5, the data converter 110 according to the second embodiment of the present invention includes a first gamma correcting unit 200, a brightness/color separating unit 210, a delay unit 220, an image modulating unit 430, a mixing unit 240, and a second gamma correcting unit 250.

The converter 110 according to the second embodiment of the present invention has the same configuration as that of the converter according to the first embodiment of the present invention except the image modulating unit 430 and thus a detailed description thereof will be omitted.

An image modulating unit 430 according to third embodiment of the present invention converts one frame of the original image into two conversion frames, filters the boundary between the moving display images of each of the two conversion frames converted according to the motion vector based on the frame control signal FCS such that the gradient of the boundary becomes smooth and an undershoot is generated in the boundary, and generates the modulated data R'G'B'.

Figure 17:
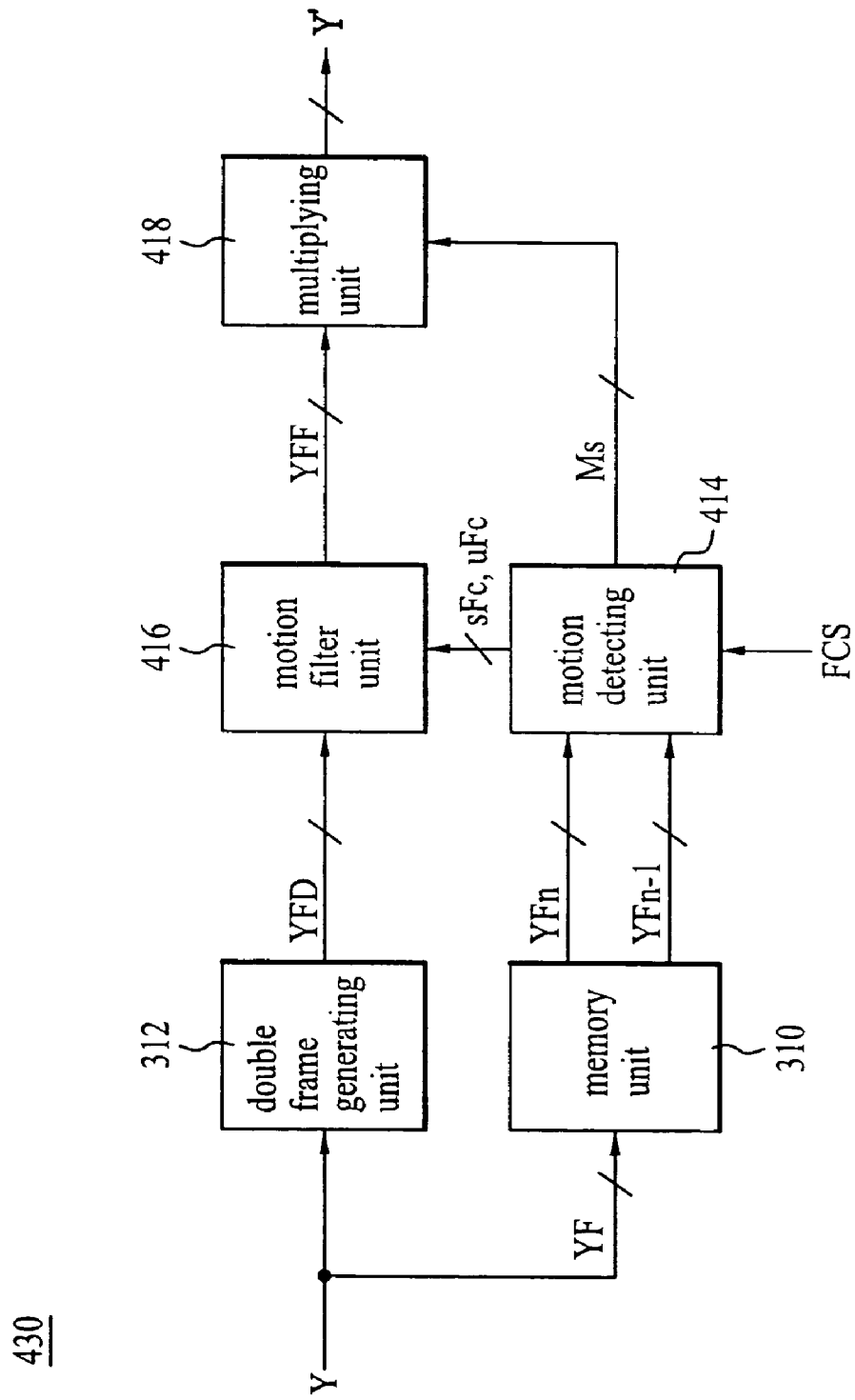
FIG. 17 is a schematic block diagram showing an image modulating unit according to a third embodiment of the present invention shown in FIG. 16.

The image modulating unit 430 includes a memory unit 310, a double frame generating unit 312, a motion detecting unit 414, a motion filter unit 416, and a multiplying unit 418, as shown in FIG. 17.

The memory unit 310 and the double frame generating unit 312 in the image modulating unit 430 are the same as those of the image modulating unit according to the first embodiment of the present invention and a detailed description thereof will be omitted.

Figure 18:
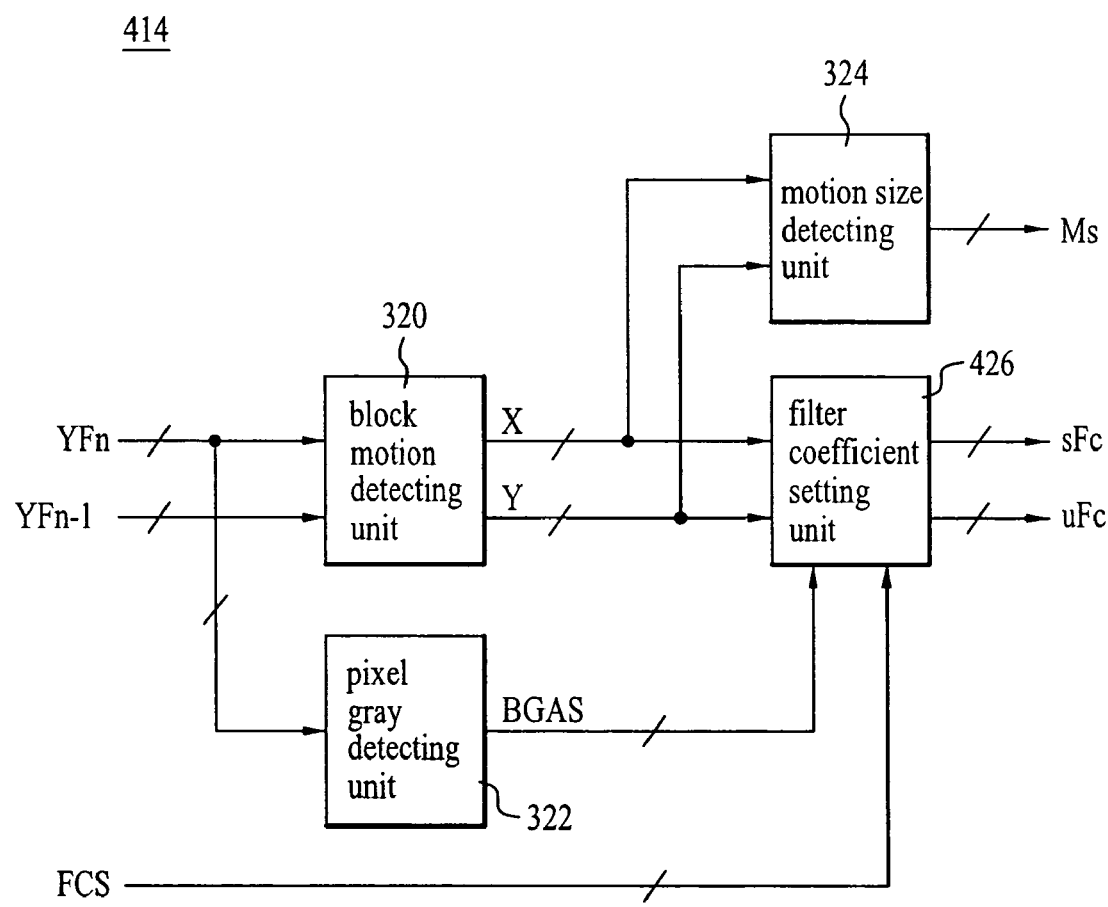
FIG. 18 is a schematic block diagram showing a motion detecting unit shown in FIG. 17.

The motion detecting unit 414 includes a block motion detecting unit 320, a pixel gray detecting unit 322, a motion size detecting unit 324, and a filter coefficient setting unit 426, as shown in FIG. 18.

The motion detecting unit 414 has the same configuration as that of the motion detecting unit 314 according to the first embodiment of the present invention except the filter coefficient setting unit 426 and thus a detailed description thereof will be omitted.

Figure 19:
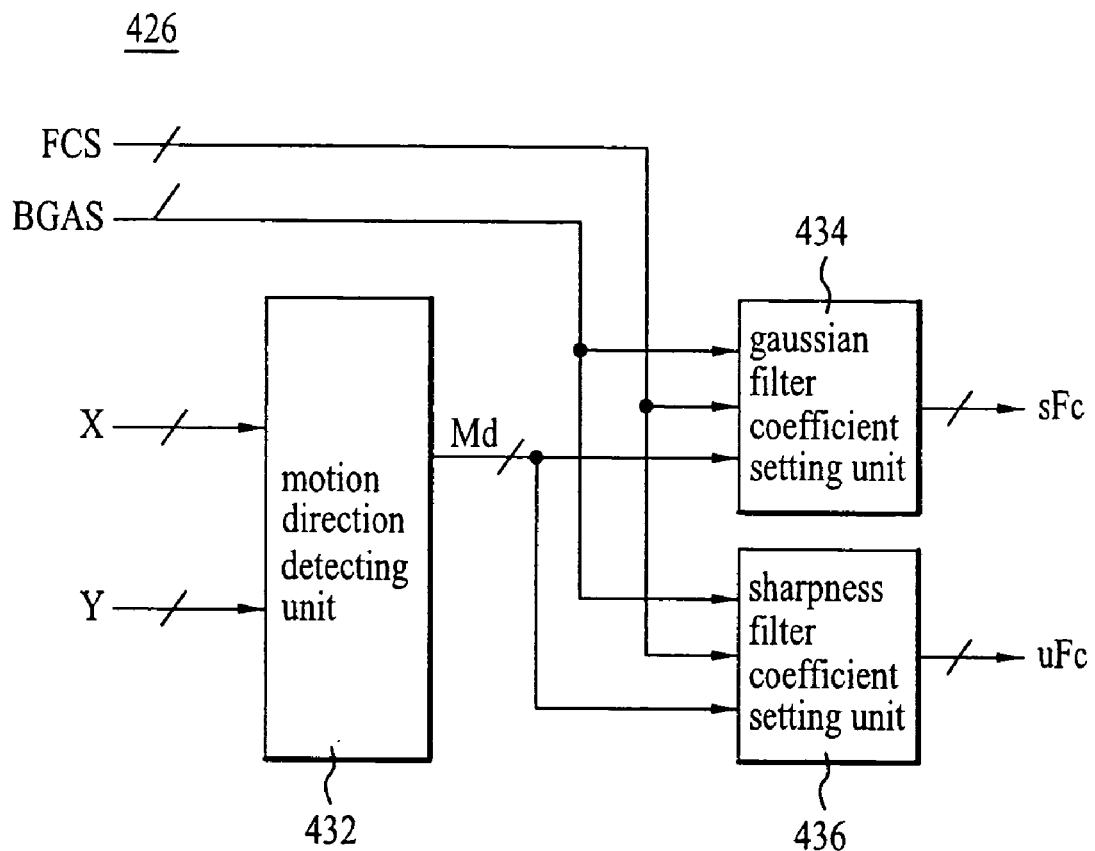
FIG. 19 is a schematic block diagram showing a filter coefficient setting unit shown in FIG. 18.

As shown in FIG. 19, the filter coefficient setting unit 426 includes a motion direction detecting unit 432, a Gaussian filter coefficient setting unit 434, and a sharpness filter coefficient setting unit 436.

The motion direction detecting unit 432 detects a motion direction signal Md in the i×i block unit according to the motion vectors X and Y supplied from the block motion detecting unit 320 and supplies the motion direction signals Md to the Gaussian filter coefficient setting unit 434 and the sharpness filter coefficient setting unit 436. The motion direction signal Md in the i×i block unit is determined by any one of eight displacements including left side<->right side, upper side<->lower side, left upper corner<->right lower corner and left lower corner<->right upper corner.

The Gaussian filter coefficient setting unit 434 sets the Gaussian filter coefficient sFc for setting the gradient of the boundary between the moving display images in the motion direction Md supplied from the motion direction detecting unit 432 to vary depending on the frame control signal FCS, according to the logic state of the boundary gray level analysis signal BGAS.

Figure 20A:
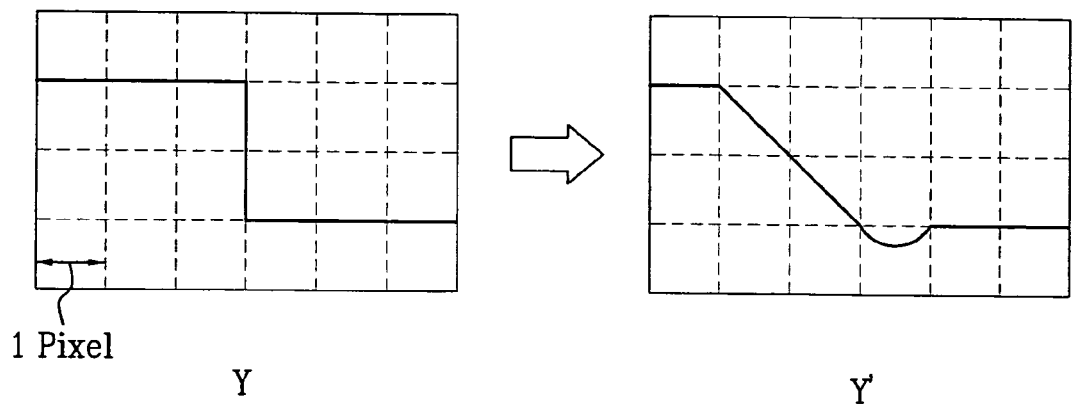
FIGS. 20A to 20D are waveform diagrams showing boundaries between moving display images upon Gaussian and sharpness filtering according to an embodiment of the present invention.

More specifically, when the frame control signal FCS is in the high level ($N^{th}$ frame) and the boundary gray level analysis signal BGAS is in the high level, the Gaussian filter coefficient setting unit 434 sets the Gaussian filter coefficient sFc such that the brightness components of two pixels before the boundary between the moving display images in the motion direction Md have the predetermined gradient, as shown in FIG. 20A.

Figure 20B:
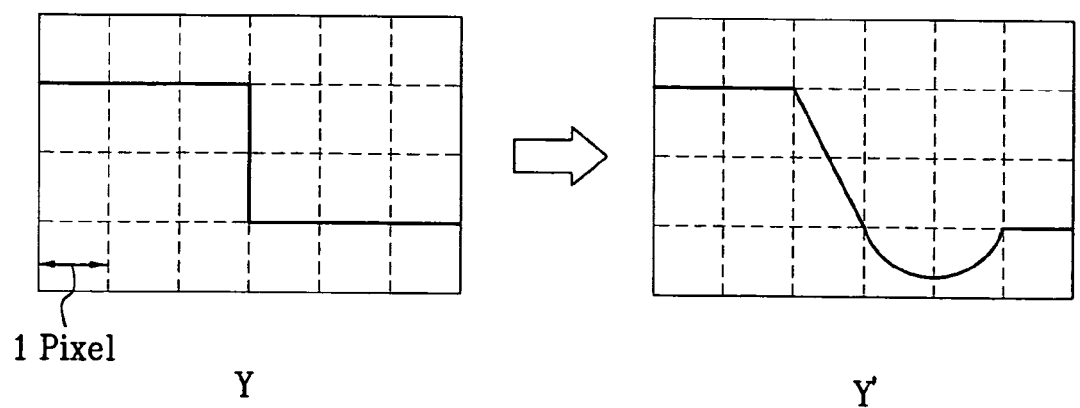

When the frame control signal FCS is in the low level ($N+1^{th}$ frame) and the boundary gray level analysis signal BGAS is in the high level, the Gaussian filter coefficient setting unit 434 sets the Gaussian filter coefficient sFc such that the brightness component of one pixel before the boundary between the moving display images in the motion direction Md has the predetermined gradient, as shown in FIG. 20B.

Figure 20C:
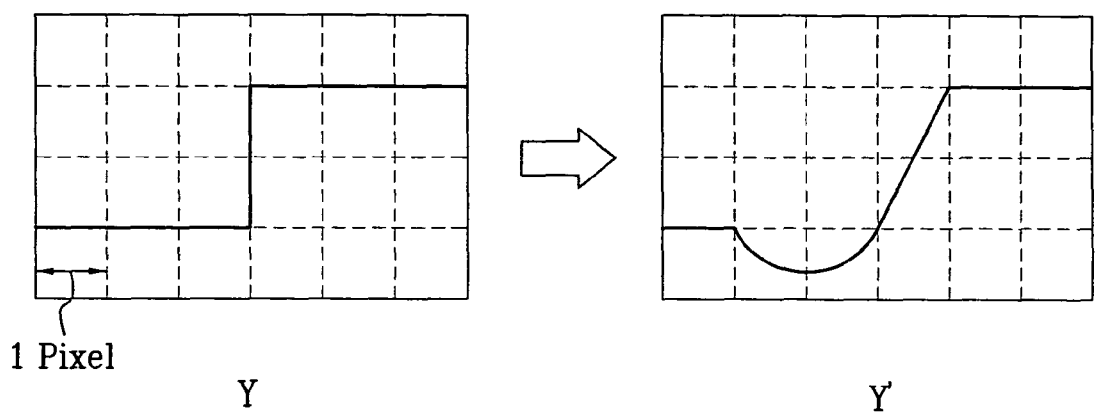

In contrast, when the frame control signal FCS is in the high level ($N^{th}$ frame) and the boundary gray level analysis signal BGAS is in the low level, the Gaussian filter coefficient setting unit 434 sets the Gaussian filter coefficient sFc such that the brightness component of one pixel after the boundary between the moving display images in the motion direction Md has the predetermined gradient, as shown in FIG. 20C.

Figure 20D:
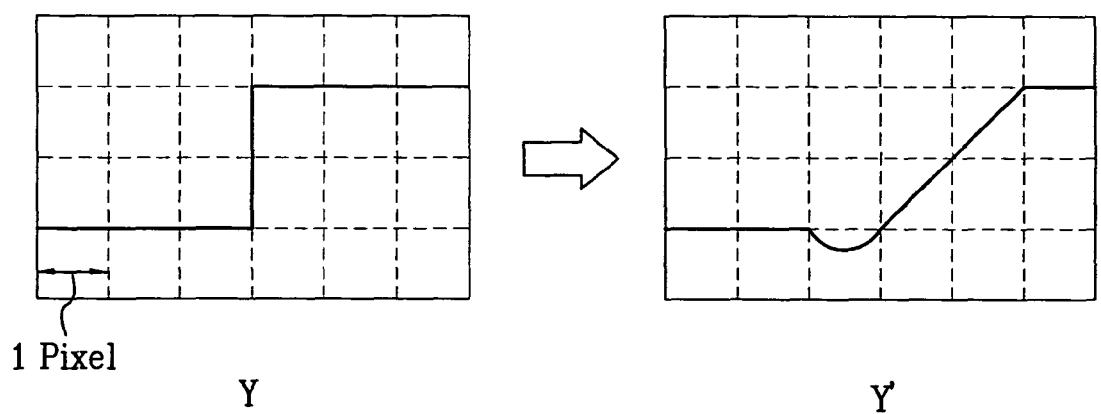

When the frame control signal FCS is in the low level ($N+1^{th}$ frame) and the boundary gray level analysis signal BGAS is in the low level, the Gaussian filter coefficient setting unit 434 sets the Gaussian filter coefficient sFc such that the brightness components of two pixels after the boundary between the moving display images in the motion direction Md have the predetermined gradient, as shown in FIG. 20D.

The sharpness filter coefficient setting unit 436 sets the sharpness filter coefficient uFc for generating the undershoot in the boundary between the moving display images in the motion direction Md supplied from the motion direction detecting unit 432 to vary depending on the frame control signal FCS, according to the logic state of the boundary gray level analysis signal BGAS.

More specifically, when the frame control signal FCS is in the high level ($N^{th}$ frame) and the boundary gray analysis signal BGAS is in the high level, the sharpness filter coefficient setting unit 436 sets the sharpness filter coefficient uFc such that the undershoot is generated in the brightness component of one pixel after the boundary between the moving display images which move in the motion direction Md, as shown in FIG. 20A.

When the frame control signal FCS is in the low level ($N+1^{th}$ frame) and the boundary gray level analysis signal BGAS is in the high level, the sharpness filter coefficient setting unit 436 sets the sharpness filter coefficient uFc such that the undershoot is generated in the brightness components of two pixels after the boundary between the moving display images in the motion direction Md, as shown in FIG. 20B.

In contrast, when the frame control signal FCS is in the high level ($N^{th}$ frame) and the boundary gray level analysis signal BGAS is in the low level, the sharpness filter coefficient setting unit 436 sets the sharpness filter coefficient uFc such that the undershoot is generated in the brightness components of two pixels before the boundary between the moving display images in the motion direction Md, as shown in FIG. 20C.

When the frame control signal FCS is in the low level ($N+1^{th}$ frame) and the boundary gray level analysis signal BGAS is in the low level, the sharpness filter coefficient setting unit 436 sets the sharpness filter coefficient uFc such that the undershoot is generated in the brightness component of one pixel before the boundary between the moving display images in the motion direction Md, as shown in FIG. 20D.

In FIG. 17, the motion filter unit 416 filters the brightness component YFD of the conversion frame supplied from the double frame generating unit 312 using the Gaussian filter coefficient sFc and the sharpness filter coefficient uFc supplied from the motion detecting unit 414.

Figure 21:
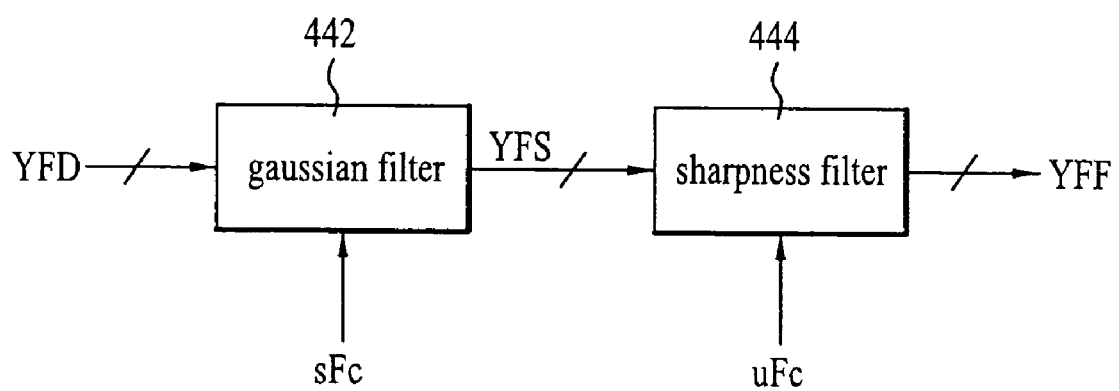
FIG. 21 is a schematic block diagram showing a motion filter unit according to a third embodiment of the present invention shown in FIG. 17.

The motion filter unit 416 includes a Gaussian filter 442 and a sharpness filter 444, as shown in FIG. 21.

The Gaussian filter 442 smoothly filters the boundary between the moving display images in the brightness component YFD of the conversion frame supplied from the double frame generating unit 312 according to the Gaussian filter coefficient sFc and supplies the smoothly filtered brightness component YFS of the conversion frame to the sharpness filter 444. The Gaussian filter 442 smoothly filters the boundary between the moving display images to have the predetermined gradient according to the Gaussian filter coefficient sFc, as shown in FIGS. 20A to 20D.

The sharpness filter 444 sharply filters the boundary between the moving display images in the smoothly filtered brightness component YFS of the conversion frame supplied from the Gaussian filter 442 according to the sharpness filter coefficient uFc such that the undershoot is generated in the boundary and supplies the sharply filtered brightness component YFF of the conversion frame to the multiplying unit 318. The sharpness filter 444 sharply filters the boundary between the moving display images according to the sharpness filter coefficient uFc, as shown in FIGS. 20A to 20D.

In FIG. 17, the multiplying unit 418 multiplies the filtered brightness component YFF of the conversion frame by the motion size signal Ms and supplies the modulated brightness component Y' of the conversion frame to the mixing unit 240. The boundary between the moving display images in the filtered brightness component YFF of the $N^{th}$ conversion frame has the gradient and the undershoot corresponding to the motion size signal Ms. The boundary between the moving display images in the filtered brightness component YFF of the $N+1^{th}$ conversion frame has the gradient and the undershoot corresponding to the motion size signal Ms.

The image modulating unit 430 according to the third embodiment of the present invention converts one frame of the original image into the first and second conversion frames, filters the brightness components of the conversion frames to have the gradient and the undershoot corresponding to the motion size signal Ms in the boundary between the moving display images according to the motion vector, and generates the modulated data R'G'B'.

Figure 22:
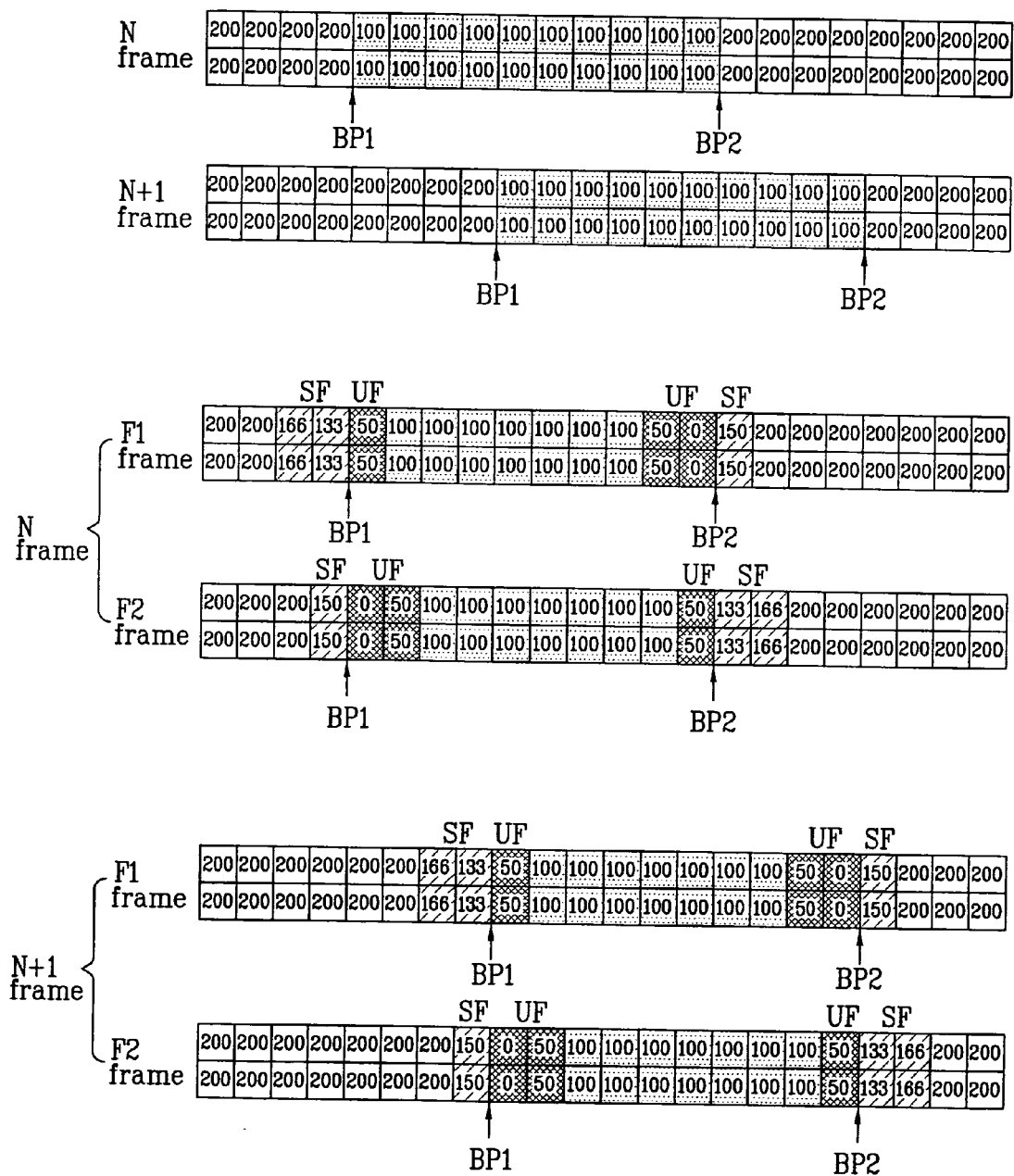
FIG. 22 is a view showing data modulated by an image modulating unit according to a third embodiment of the present invention.

For example, as shown in FIG. 22, when a rectangular image having a brightness component of 100 moves in a background image having a brightness component of 200 from the left side to the right side by four pixels, the image is modulated by the image modulating unit 430 as follows.

First, an $N^{th}$ frame image of the original image is displayed by the first and second conversion frames F1 and F2.

More specifically, in the first and second conversion frames F1 and F2 of the $N^{th}$ frame of the original image, the predetermined gradient due to the Gaussian filter coefficient sFc set according to the motion vector and the undershoot due to the sharpness filter coefficient uFc are generated in the boundaries BP1 and BP2 between the moving display images.

That is, in the first conversion frame F1 of the $N^{th}$ frame of the original image, the brightness components of two pixels before the first boundary BP1 are smoothly filtered (SF) and the brightness component of one pixel after the first boundary BP1 is sharply filtered (UF) when a high brightness component is changed to a low brightness component. When the low brightness component is changed to the high brightness component, the brightness components of two pixels before the second boundary BP2 are sharply filtered (UF) and the brightness component of one pixel after the second boundary BP2 is smoothly filtered (SF).

In the second conversion frame F2 of the $N^{th}$ frame of the original image, the brightness component of one pixel before the first boundary BP1 is smoothly filtered (SF) and the brightness components of two pixels after the first boundary BP1 are sharply filtered (UF) when the high brightness component is changed to the low brightness component. When the low brightness component is changed to the high brightness component, the brightness component of one pixel before the second boundary BP2 is sharply filtered (UF) and the brightness components of the two pixels after the second boundary BP2 are smoothly filtered (SF).

In the first and second conversion frames F1 and F2 of the $N+1^{th}$ frame of the original image, the predetermined gradient due to the Gaussian filter coefficient sFc set according to the motion vector and the undershoot due to the sharpness filter coefficient uFc are generated in the boundaries BP1 and BP2 between the moving display images.

That is, in the first conversion frame F1 of the $N+1^{th}$ frame of the original image, the brightness components of two pixels before the first boundary BP1 are smoothly filtered (SF) and the brightness component of one pixel after the first boundary BP1 is sharply filtered (UF) when a high brightness component is changed to a low brightness component. When the low brightness component is changed to the high brightness component, the brightness components of two pixels before the second boundary BP2 are sharply filtered (UF) and the brightness component of one pixel after the second boundary BP2 is smoothly filtered (SF).

In the second conversion frame F2 of the $N+1^{th}$ frame of the original image, the brightness component of one pixel before the first boundary BP1 is smoothly filtered (SF) and the brightness components of two pixels after the first boundary BP1 are sharply filtered (UF) when the high brightness component is changed to the low brightness component. When the low brightness component is changed to the high brightness component, the brightness component of one pixel before the second boundary BP2 is sharply filtered (UF) and the brightness components of the two pixels after the second boundary BP2 are smoothly filtered (SF).

Accordingly, the image modulating unit 230 according to the third embodiment of the present invention can make the moving display image sharper and stereoscopically display a still image without noise.

Figure 23:
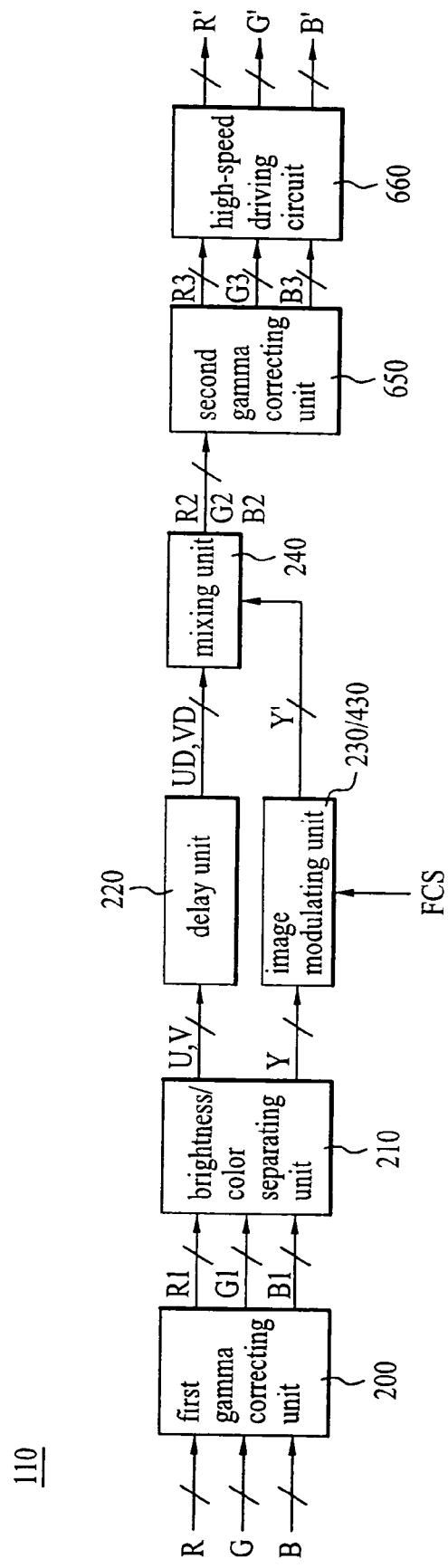
FIG. 23 is a schematic block diagram showing a data converter according to a third embodiment of the present invention shown in FIG. 5.

FIG. 23 is a schematic block diagram showing a converter according to a third embodiment of the present invention.

Referring to FIGS. 23 and 5, the converter 110 according to the third embodiment of the present invention includes a first gamma correcting unit 200, a brightness/color separating unit 210, a delay unit 220, an image modulating unit 230/430, a mixing unit 240, a second gamma correcting unit 650, and a high-speed driving circuit 660.

The first gamma correcting unit 200, the brightness/color separating unit 210, the delay unit 220, the image modulating unit 230/430 and the mixing unit 240 are the same as those of the first or second embodiment and thus a detailed description thereof will be omitted.

The second gamma correcting unit 650 gamma-corrects the second data R2, G2 and B2 supplied from the mixing unit 240 by Equation 10 to generate third data R3, G3 and B3.

$$R3=R2^{1/\lambda}$$

$$G3=G2^{1/\lambda}$$

$$B3=B2^{1/\lambda} \qquad \text{Equation 10}$$

The second gamma correcting unit 650 gamma-corrects the second data R2, G2 and B2 to generate the third data R3, G3 and B3 suitable for the driving circuit of the image display unit 102 using the look-up table and supplies the third data R3, G3 and B3 to the high-speed driving circuit 660.

Figure 24:
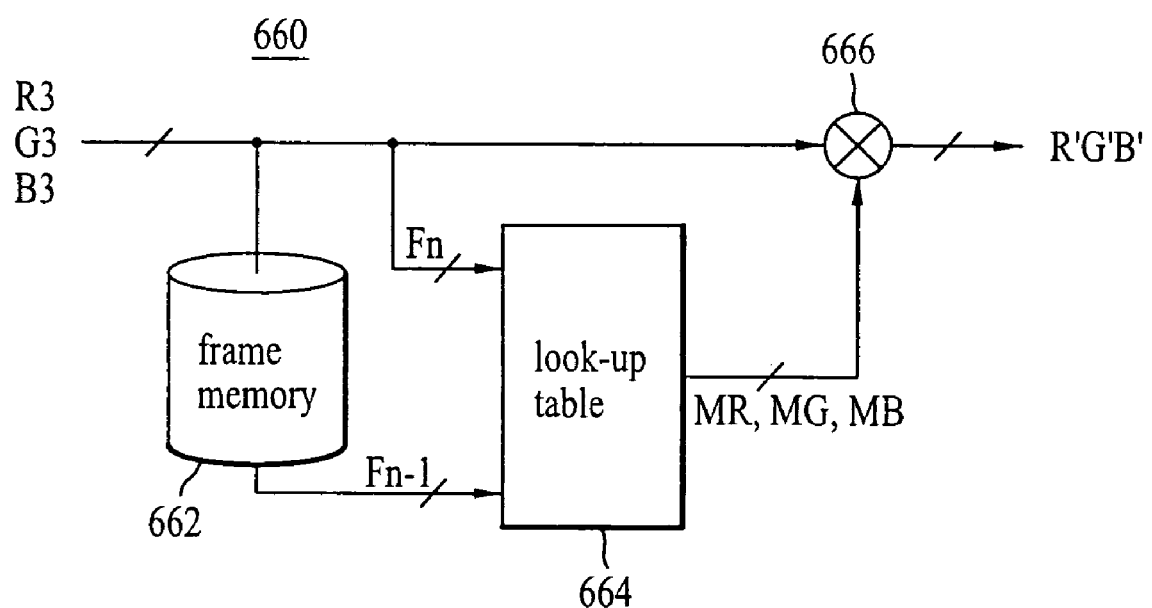
FIG. 24 is a schematic block diagram showing a high-speed driving apparatus shown in FIG. 23.

The high-speed driving circuit 660, as shown in FIG. 24, includes a frame memory 662 for storing the third data R3, G3 and B3 supplied from the second gamma correcting unit 650, a look-up table 664 for comparing the third data R3, G3 and B3 of a current frame Fn supplied from the second gamma correcting unit 650 with the third data R3, G3 and B3 of a previous frame Fn-1 supplied from the frame memory 662 and generating high-speed data MR, MG and MB for increasing the response speed of the liquid crystal, and a mixing unit 666 for mixing the high-speed data MR, MG and MB supplied from the look-up table 664 with the third data R3, G3 and B3 of the current frame Fn and generating the modulated data R'G'B'.

In the look-up table 664, the high-speed data MR, Mg and MB having a voltage larger than that of the third data R3, G3 and B3 of the current frame Fn in order to increase the response speed of the liquid crystal to correspond to the gray value of the image which is rapidly changed is registered.

The mixing unit 666 mixes the third data R3, G3 and B3 of the current frame Fn with the high-speed data MR, MG and MB to generate the modulated data R'G'B' and supplies the generated modulated data R'G'B' to the timing controller 108.

The converter 110 according to the third embodiment of the present invention converts one frame of the original image into the first and second conversion frames, filters the brightness components of the conversion frames to have the gradient and the undershoot corresponding to the motion size signal Ms in the boundary between the moving display images according to the motion vector, and converts the filtered brightness components into the modulated data for increasing the response speed of the liquid crystal, thereby removing motion blurring of the moving image.

As described above, according to an apparatus and method for driving a liquid crystal display device of the embodiments of the present invention, it is possible to remove motion blurring by detecting a motion vector from source data, converting one frame of an input original image into two conversion frames, filtering a boundary between the moving display images of each of the two conversion frames converted according to the motion vector such that the gradient of the boundary becomes smooth and/or an undershoot is generated in the boundary, and generating the modulated data. Accordingly, the embodiments of the present invention can make a moving display image sharper and stereoscopically display a still image without noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a liquid crystal display device including an image display unit including liquid crystal cells, a plurality of gate lines and a plurality of data lines, the apparatus comprising:

a converter for detecting a motion vector from externally input source data, converting one frame of an input original image of the input source data into at least two conversion frames, filtering images of the at least two conversion frames according to the motion vector, and generating modulated data;

a gate driver for supplying a scan signal to the gate lines; and a data driver for converting the modulated data into an analog video signal and supplying the analog video signal to the data lines, wherein the converter comprises:

a first gamma correcting unit for gamma-correcting the input source data in the one frame and generating first data;

a brightness/color separating unit for dividing the first data into a brightness component and a color component;

an image modulating unit for detecting the motion vector from the brightness component, converting the brightness component of the one frame into the at least two conversion frames, and filtering the images of the at least two conversion frames according to the motion vector, and generating modulated brightness component;

a delay unit for delaying the color component while the image modulating unit generates the modulated brightness component;

a mixing unit for mixing the modulated brightness component with the delayed color component and generating second data; and a second gamma correcting unit for gamma-correcting the second data supplied from the mixing unit and generating the modulated data, wherein the image modulating unit comprises:

a memory unit for storing the brightness component in the one frame supplied from the brightness/color separating unit;

a double frame converting unit for converting the brightness component of the input original image in the one frame supplied from the memory unit into first and second conversion frames corresponding to the input original image and sequentially outputting the first and second conversion frames;

a motion detecting unit for setting a Gaussian filter coefficient and a sharpness filter coefficient according to a frame control signal using a brightness component of a previous frame and a brightness component of a current frame of the input original image supplied from the memory unit and detecting a motion size signal of a moving image, wherein the Gaussian filter coefficient is set such that the gradient of the boundary of a moving image in the conversion frames becomes smooth and wherein the sharpness filter coefficient is set such that an undershoot is generated in the boundary;

a motion filter unit for filtering the brightness components of the conversion frames according to the Gaussian filter coefficient and the sharpness filter coefficient; and a multiplying unit for multiplying the brightness components of the conversion frames filtered by the motion filter unit with the motion size signal and supplying the multiplied signal to the mixing unit.

2. The apparatus according to claim 1, further comprising a timing controller for aligning the modulated data and supplying the aligned modulated data to the data driver, generating a data control signal to control the data driver, and generating a gate control signal to control the gate driver.

3. The apparatus according to claim 1, wherein the motion detecting unit comprises:

a block motion detecting unit for comparing the brightness component of the previous frame with the brightness component of the current frame in an i×i block unit and detecting an X-axis displacement and a Y-axis displacement of a motion;

a pixel gray detecting unit for comparing brightness components of pixels in the current frame, detecting a variation in gray level of a pixel unit to detect a boundary between moving display images, and generating a boundary gray level analysis signal corresponding to the variation in gray level of the boundary;

a filter coefficient setting unit for setting the Gaussian filter coefficient and the sharpness filter coefficient according to the boundary gray level analysis signal using the X-axis displacement and the Y-axis displacement; and a motion size detecting unit for detecting the motion size signal using the X-axis displacement and the Y-axis displacement.

4. The apparatus according to claim 3, wherein the pixel gray detecting unit generates the boundary gray level analysis signal having a high level when the gray level of the boundary is changed from a high gray level to a low gray level and generates the boundary gray level analysis signal having a low level when the gray level of the boundary is changed from the low gray level from the high gray level.

5. The apparatus according to claim 4, wherein the filter coefficient setting unit comprises:

a motion direction detecting unit for detecting a motion direction signal using the X-axis displacement and the Y-axis displacement;

a selecting unit for selectively outputting the motion direction signal according to the frame control signal;

a Gaussian filter coefficient setting unit for setting the Gaussian filter coefficient corresponding to the motion direction signal supplied from the selecting unit, according to the boundary gray level analysis signal; and a sharpness filter coefficient setting unit for setting the sharpness filter coefficient corresponding to the motion direction signal supplied from the selecting unit, according to the boundary gray level analysis signal.

6. The apparatus according to claim 5, wherein the Gaussian filter coefficient setting unit sets the Gaussian filter coefficient for smoothly filtering a brightness component of at least one pixel immediately adjacent to the boundary between the moving display images in a direction corresponding to the motion direction signal according to the boundary gray level analysis signal.

7. The apparatus according to claim 6, wherein the Gaussian filter coefficient setting unit sets the Gaussian filter coefficient such that brightness components of two pixels immediately before the boundary are smoothly filtered when the boundary gray level analysis signal has the high level, and sets the Gaussian filter coefficient such that a brightness component of one pixel immediately before the boundary is smoothly filtered when the boundary gray level analysis signal has the low level.

8. The apparatus according to claim 5, wherein the sharpness filter coefficient setting unit sets the sharpness filter coefficient for sharply filtering a brightness component of at least one pixel immediately adjacent to the boundary between the moving display images in a direction corresponding to the motion direction signal according to the boundary gray analysis signal.

9. The apparatus according to claim 8, wherein the sharpness filter coefficient setting unit sets the sharpness filter coefficient such that brightness components of two pixels immediately before the boundary are sharply filtered when the boundary gray analysis signal has the high level, and sets the sharpness filter coefficient such that a brightness component of one pixel immediately before the boundary is sharply filtered when the boundary gray level analysis signal has the low level.

10. The apparatus according to claim 5, wherein the motion filter unit comprises:
 a selecting unit for selectively outputting the brightness components of the first and second conversion frames according to the frame control signal;
 a Gaussian filter for smoothly filtering the brightness component of the first conversion frame supplied from the selecting unit according to the Gaussian filter coefficient and supplying the filtered brightness component to the multiplying unit; and
 a sharpness filter for sharply filtering the brightness component of the second conversion frame supplied from the selecting unit according to the sharpness filter coefficient and supplying the filtered brightness component to the multiplying unit.

11. The apparatus according to claim 4, wherein the filter coefficient setting unit comprises:
 a motion direction detecting unit for detecting a motion direction signal using the X-axis displacement and the Y-axis displacement;
 a Gaussian filter coefficient setting unit for setting the Gaussian filter coefficient to vary depending on the motion direction signal, according to the frame control signal and the boundary gray level analysis signal; and
 a sharpness filter coefficient setting unit for setting the sharpness filter coefficient to vary depending on the motion direction signal, according to the frame control signal and the boundary gray level analysis signal.

12. The apparatus according to claim 11, wherein the Gaussian filter coefficient setting unit sets the Gaussian filter coefficient for smoothly filtering the brightness of at least one pixel immediately adjacent to a boundary between the moving display images in a direction corresponding to the motion direction signal to vary depending on the boundary gray level analysis signal, according to the frame control signal.

13. The apparatus according to claim 12, wherein the Gaussian filter coefficient setting unit:
 sets the Gaussian filter coefficient such that brightness components of two pixels immediately before the boundary are smoothly filtered when the frame control signal has a high level and the boundary gray level analysis signal has the high level,
 sets the Gaussian filter coefficient such that a brightness component of one pixel before the boundary is smoothly filtered when the frame control signal has a low level and the boundary gray level analysis signal has the high level,
 sets the Gaussian filter coefficient such that a brightness component of one pixel immediately after the boundary is smoothly filtered when the frame control signal has the high level and the boundary gray level analysis signal has the low level, and
 sets the Gaussian filter coefficient such that brightness components of two pixels immediately after the boundary are smoothly filtered when the frame control signal has the low level and the boundary gray analysis signal has the low level.

14. The apparatus according to claim 11, wherein the sharpness filter coefficient setting unit sets the sharpness filter coefficient for sharply filtering the brightness of at least one pixel immediately adjacent to a boundary between the moving display images in a direction corresponding to the motion direction signal to vary depending on the boundary gray level analysis signal, according to the frame control signal.

15. The apparatus according to claim 14, wherein the sharpness filter coefficient setting unit:
 sets the sharpness filter coefficient such that a brightness component of one pixel immediately after the boundary is sharply filtered when the frame control signal has a high level and the boundary gray level analysis signal has the high level,
 sets the sharpness filter coefficient such that brightness components of two pixels immediately after the boundary are sharply filtered when the frame control signal has a low level and the boundary gray level analysis signal has the high level,
 sets the sharpness filter coefficient such that brightness components of two pixels immediately before the boundary are sharply filtered when the frame control signal has the high level and the boundary gray level analysis signal has the low level, and
 sets the sharpness filter coefficient such that a brightness component of one pixel immediately before the boundary is sharply filtered when the frame control signal has the low level and the boundary gray level analysis signal has the low level.

16. The apparatus according to claim 11, wherein the motion filter unit comprises:
 a Gaussian filter for smoothly filtering the brightness components of the conversion frames according to the Gaussian filter coefficient; and
 a sharpness filter for sharply filtering the brightness components of the conversion frames filtered by the Gaussian filter according to the sharpness filter coefficient and supplying the filtered brightness components to the multiplying unit.

17. An apparatus for driving a liquid crystal display device including an image display unit including liquid crystal cells, a plurality of gate lines and a plurality of data lines, the apparatus comprising:
 a converter for detecting a motion vector from externally input source data, converting one frame of an input original image of the input source data into at least two conversion frames, filtering images of the at least two conversion frames according to the motion vector, and generating modulated data;

a gate driver for supplying a scan signal to the gate lines; and a data driver for converting the modulated data into an analog video signal and supplying the analog video signal to the data lines, wherein the converter comprises:

a first gamma correcting unit for gamma-correcting the input source data in the one frame and generating first data;

a brightness/color separating unit for dividing the first data into a brightness component and a color component;

an image modulating unit for detecting the motion vector from the brightness component, converting the brightness component of the one frame into the at least two conversion frames, and filtering the images of the at least two conversion frames according to the motion vector, and generating modulated brightness component;

a delay unit for delaying the color component while the image modulating unit generates the modulated brightness component;

a mixing unit for mixing the modulated brightness component with the delayed color component and generating second data;

a second gamma correcting unit for gamma-correcting the second data supplied from the mixing unit and generating third data; and a high-speed driving circuit for modulating the third data and generating the modulated data for increasing the response speed of the liquid crystal.

18. The apparatus according to claim 17, wherein the image modulating unit comprises:

a memory unit for storing the brightness component in the one frame supplied from the brightness/color separating unit;

a double frame converting unit for converting the brightness component of the input original image in the one frame supplied from the memory unit into first and second conversion frames corresponding to the input original image and sequentially outputting the first and second conversion frames;

a motion detecting unit for setting a Gaussian filter coefficient and a sharpness filter coefficient according to a frame control signal using a brightness component of a previous frame and a brightness component of a current frame of the input original image supplied from the memory unit and detecting a motion size signal of a moving image;

a motion filter unit for filtering the brightness components of the conversion frames according to the Gaussian filter coefficient and the sharpness filter coefficient; and a multiplying unit for multiplying the brightness components of the conversion frames filtered by the motion filter unit by the motion size signal and supplying the multiplied signal to the mixing unit.

19. The apparatus according to claim 18, wherein the motion detecting unit comprises:

a block motion detecting unit for comparing the brightness component of the previous frame with the brightness component of the current frame in an i×i block unit and detecting an X-axis displacement and a Y-axis displacement of a motion;

a pixel gray detecting unit for comparing brightness components of pixels in the current frame, detecting a variation in gray level of a pixel unit to detect a boundary between moving display images, and generating a boundary gray level analysis signal corresponding to the variation in gray level of the boundary;

a filter coefficient setting unit for setting the Gaussian filter coefficient and the sharpness filter coefficient according to the boundary gray level analysis signal using the X-axis displacement and the Y-axis displacement; and a motion size detecting unit for detecting the motion size signal using the X-axis displacement and the Y-axis displacement.

20. The apparatus according to claim 19, wherein the pixel gray detecting unit generates the boundary gray level analysis signal having a high level when the gray level of the boundary is changed from a high gray level to a low gray level and generates the boundary gray level analysis signal having a low level when the gray level of the boundary is changed from the low gray level from the high gray level.

21. The apparatus according to claim 20, wherein the filter coefficient setting unit comprises:

a motion direction detecting unit for detecting a motion direction signal using the X-axis displacement and the Y-axis displacement;

a selecting unit for selectively outputting the motion direction signal according to the frame control signal;

a Gaussian filter coefficient setting unit for setting the Gaussian filter coefficient corresponding to the motion direction signal supplied from the selecting unit, according to the boundary gray level analysis signal; and a sharpness filter coefficient setting unit for setting the sharpness filter coefficient corresponding to the motion direction signal supplied from the selecting unit, according to the boundary gray level analysis signal.

22. The apparatus according to claim 20, wherein the filter coefficient setting unit comprises:

a motion direction detecting unit for detecting a motion direction signal using the X-axis displacement and the Y-axis displacement;

a Gaussian filter coefficient setting unit for setting the Gaussian filter coefficient to vary depending on the motion direction signal, according to the frame control signal and the boundary gray level analysis signal; and a sharpness filter coefficient setting unit for setting the sharpness filter coefficient to vary depending on the motion direction signal, according to the frame control signal and the boundary gray level analysis signal.

23. The apparatus according to claim 17, wherein the high-speed driving circuit comprises:

a frame memory for storing the third data supplied from the second gamma correcting unit; and a look-up table for generating the modulated data using the third data of a current frame supplied from the second gamma correcting unit and the third data of a previous frame from the frame memory.

24. A method for driving a liquid crystal display device having an image display unit for displaying an image, the method comprising:

detecting a motion vector from externally input source data, converting one frame of an input original image into at least two conversion frames, filtering images of the at least two conversion frames according to the motion vector, and generating modulated data;

supplying a scan signal to the gate lines; and converting the modulated data into an analog video signal in synchronization with the scan signal and supplying the analog video signal to the data lines, wherein the detecting step comprises:

gamma-correcting the input source data in the one frame unit and generating first data;

dividing the first data into a brightness component and a color component;

detecting the motion vector from the brightness component, converting the brightness component of the one frame into the at least two conversion frames, and filtering the images of the at least two conversion frames according to the motion vector, and generating modulated brightness component;

delaying the color component while generating the modulated brightness component;

mixing the modulated brightness component with the delayed color component and generating second data; and gamma-correcting the second data and generating the modulated data, wherein the step of generating the modulated brightness component comprises:

storing the divided brightness component in the one frame;

converting the brightness component of an original image in the one frame into first and second conversion frames corresponding to the input original image and sequentially outputting the first and second conversion frames;

setting a Gaussian filter coefficient and a sharpness filter coefficient according to a frame control signal using a brightness component of a previous frame and a brightness component of a current frame of the input original image and detecting a motion size signal of a moving image, wherein the Gaussian filter coefficient is set such that the gradient of the boundary of a moving image in the conversion frames becomes smooth and wherein the sharpness filter coefficient is set such that an undershoot is generated in the boundary;

filtering the brightness components of the conversion frames according to the Gaussian filter coefficient and the sharpness filter coefficient; and multiplying the brightness components of the filtered conversion frames with the motion size signal and generating the modulated brightness component.

25. The method according to claim 24, wherein the step of detecting the motion size signal comprises:

comparing the brightness component of the previous frame with the brightness component of the current frame in an ixi block unit and detecting an X-axis displacement and a Y-axis displacement of a motion;

comparing brightness components of pixels in the current frame, detecting a variation in gray level of a pixel unit to detect a boundary between moving display images, and generating a boundary gray level analysis signal corresponding to the variation in gray level of the boundary;

setting the Gaussian filter coefficient and the sharpness filter coefficient according to the boundary gray level analysis signal using the X-axis displacement and the Y-axis displacement; and detecting the motion size signal using the X-axis displacement and the Y-axis displacement.

26. The method according to claim 25, wherein the step of generating boundary gray level analysis signal comprises generating the boundary gray level analysis signal having a high level when the gray level of the boundary is changed from a high gray level to a low gray level and generating the boundary gray level analysis signal having a low level when the gray level of the boundary is changed from the low gray level from the high gray level.

27. The method according to claim 26, wherein the step of setting the Gaussian filter coefficient and the sharpness filter coefficient comprises:

detecting a motion direction signal using the X-axis displacement and the Y-axis displacement;

selectively outputting the motion direction signal according to the frame control signal;

setting the Gaussian filter coefficient which depends on the selected motion direction signal, according to the boundary gray level analysis signal; and setting the sharpness filter coefficient which depends on the selected motion direction signal, according to the boundary gray level analysis signal.

28. The method according to claim 27, wherein the step of setting the Gaussian filter coefficient comprises setting the Gaussian filter coefficient for smoothly filtering a brightness component of at least one pixel immediately adjacent to the boundary between the moving display images in a direction corresponding to the motion direction signal according to the boundary gray level analysis signal.

29. The method according to claim 28, wherein the step of setting the Gaussian filter coefficient comprises setting the Gaussian filter coefficient such that brightness components of two pixels immediately before the boundary are smoothly filtered when the boundary gray level analysis signal has the high level, and setting the Gaussian filter coefficient such that a brightness component of one pixel immediately before the boundary is smoothly filtered when the boundary gray level analysis signal has the low level.

30. The method according to claim 27, wherein the step of setting the sharpness filter coefficient comprises setting the sharpness filter coefficient for sharply filtering a brightness component of at least one pixel immediately adjacent to the boundary between the moving display images in a direction corresponding to the motion direction signal according to the boundary gray level analysis signal.

31. The method according to claim 30, wherein the step of setting the sharpness filter coefficient comprises setting the sharpness filter coefficient such that brightness components of two pixels immediately before the boundary are sharply filtered when the boundary gray level analysis signal has the high level, and setting the sharpness filter coefficient such that a brightness component of one pixel immediately before the boundary is sharply filtered when the boundary gray level analysis signal has the low level.

32. The method according to claim 27, wherein the step of filtering the brightness components of the conversion frames comprises:

selectively outputting the brightness components of the first and second conversion frames according to the frame control signal;

smoothly filtering the brightness component of the selected first conversion frame according to the Gaussian filter coefficient; and sharply filtering the brightness component of the selected second conversion frame according to the sharpness filter coefficient.

33. The method according to claim 26, wherein the step of setting the Gaussian filter coefficient and the sharpness filter coefficient comprises:

detecting a motion direction signal using the X-axis displacement and the Y-axis displacement;

setting the Gaussian filter coefficient to vary depending on the motion direction signal, according to the frame control signal and the boundary gray level analysis signal; and setting the sharpness filter coefficient to vary depending on the motion direction signal, according to the frame control signal and the boundary gray level analysis signal.

34. The method according to claim 33, wherein the step of setting the Gaussian filter coefficient comprises setting the Gaussian filter coefficient for smoothly filtering the brightness of at least one pixel immediately adjacent to a boundary between the moving display images in a direction corresponding to the motion direction signal to vary depending on the boundary gray level analysis signal, according to the frame control signal.

35. The method according to claim 34, wherein the step of setting the Gaussian filter coefficient comprises:
setting the Gaussian filter coefficient such that brightness components of two pixels immediately before the boundary are smoothly filtered when the frame control signal has a high level and the boundary gray level analysis signal has the high level,
setting the Gaussian filter coefficient such that a brightness component of one pixel immediately before the boundary is smoothly filtered when the frame control signal has a low level and the boundary gray level analysis signal has the high level,
setting the Gaussian filter coefficient such that a brightness component of one pixel immediately after the boundary is smoothly filtered when the frame control signal has the high level and the boundary gray level analysis signal has the low level, and
setting the Gaussian filter coefficient such that brightness components of two pixels immediately after the boundary are smoothly filtered when the frame control signal has the low level and the boundary gray level analysis signal has the low level.

36. The method according to claim 33, wherein the step of setting the sharpness filter coefficient comprises setting the sharpness filter coefficient for sharply filtering the brightness of at least one pixel immediately adjacent to a boundary between the moving display images in a direction corresponding to the motion direction signal to vary depending on the boundary gray level analysis signal, according to the frame control signal.

37. The method according to claim 36, wherein the step of setting the sharpness filter coefficient comprises:
setting the sharpness filter coefficient such that a brightness component of one pixel immediately after the boundary is sharply filtered when the frame control signal has a high level and the boundary gray level analysis signal has the high level,
setting the sharpness filter coefficient such that brightness components of two pixels immediately after the boundary are sharply filtered when the frame control signal has a low level and the boundary gray level analysis signal has the high level,
setting the sharpness filter coefficient such that brightness components of two pixels immediately before the boundary are sharply filtered when the frame control signal has the high level and the boundary gray level analysis signal has the low level, and
setting the sharpness filter coefficient such that a brightness component of one pixel immediately before the boundary is sharply filtered when the frame control signal has the low level and the boundary gray level analysis signal has the low level.

38. The method according to claim 33, wherein the step of filtering the brightness components of the conversion frames comprises:
smoothly filtering the brightness components of the conversion frames according to the Gaussian filter coefficient; and
sharply filtering the brightness components of the conversion frames filtered in the step of smoothly filtering the brightness components, according to the sharpness filter coefficient.

39. A method for driving a liquid crystal display device having an image display unit for displaying an image, the method comprising:
detecting a motion vector from externally input source data, converting one frame of an input original image into at least two conversion frames, filtering images of the at least two conversion frames according to the motion vector, and generating modulated data;
supplying a scan signal to the gate lines; and
converting the modulated data into an analog video signal in synchronization with the scan signal and supplying the analog video signal to the data lines,
wherein the detecting step comprises:
gamma-correcting the input source data in the one frame unit and generating first data;
dividing the first data into a brightness component and a color component;
detecting the motion vector from the brightness component, converting the brightness component of the one frame into the at least two conversion frames, and filtering the images of the at least two conversion frames according to the motion vector, and generating modulated brightness component;
delaying the color component while generating the modulated brightness component;
mixing the modulated brightness component with the delayed color component and generating second data;
gamma-correcting the second data and generating third data; and
modulating the third data and generating the modulated data for increasing the response speed of the liquid crystal.

40. The method according to claim 39, wherein the step of generating the modulated brightness component comprises:
storing the divided brightness component in the one frame;
converting the brightness component of an original image in the one frame into first and second conversion frames corresponding to the input original image and sequentially outputting the first and second conversion frames;
setting a Gaussian filter coefficient and a sharpness filter coefficient according to a frame control signal using a brightness component of a previous frame and a brightness component of a current frame of the input original image and detecting a motion size signal of a moving image;
filtering the brightness components of the conversion frames according to the Gaussian filter coefficient and the sharpness filter coefficient; and
multiplying the brightness components of the conversion frames filtered in the step of filtering the brightness components of the conversion frames by the motion size signal and generating the modulated brightness component.

41. The method according to claim 40, wherein the step of detecting the motion size signal comprises:
comparing the brightness component of the previous frame with the brightness component of the current frame in an i×i block unit and detecting an X-axis displacement and a Y-axis displacement of a motion;
comparing brightness components of pixels in the current frame, detecting a variation in gray level of a pixel unit to detect a boundary between moving display images, and generating a boundary gray level analysis signal corresponding to the variation in gray level of the boundary;

setting the Gaussian filter coefficient and the sharpness filter coefficient according to the boundary gray level analysis signal using the X-axis displacement and the Y-axis displacement; and detecting the motion size signal using the X-axis displacement and the Y-axis displacement.

42. The method according to claim 41, wherein the step of generating boundary gray level analysis signal comprises generating the boundary gray level analysis signal having a high level when the gray level of the boundary is changed from a high gray level to a low gray level and generating the boundary gray level analysis signal having a low level when the gray level of the boundary is changed from the low gray level from the high gray level.

43. The method according to claim 42, wherein the step of setting the Gaussian filter coefficient and the sharpness filter coefficient comprises:

detecting a motion direction signal using the X-axis displacement and the Y-axis displacement;

selectively outputting the motion direction signal according to the frame control signal;

setting the Gaussian filter coefficient which depends on the selected motion direction signal, according to the boundary gray level analysis signal; and setting the sharpness filter coefficient which depends on the selected motion direction signal, according to the boundary gray level analysis signal.

44. The method according to claim 42, wherein the step of setting the Gaussian filter coefficient and the sharpness filter coefficient comprises:

detecting a motion direction signal using the X-axis displacement and the Y-axis displacement;

setting the Gaussian filter coefficient to vary depending on the motion direction signal, according to the frame control signal and the boundary gray level analysis signal; and setting the sharpness filter coefficient to vary depending on the motion direction signal, according to the frame control signal and the boundary gray level analysis signal.

45. The method according to claim 39, wherein the step of modulating the modulated data generated at the step of gamma-correcting the second data comprises:

storing the modulated data generated at the step of gamma-correcting the second data in a frame memory; and generating the modulated data for the converting step using the modulated data of a current frame and the modulated data of a previous frame from the frame memory using a look-up table.

46. The method according to claim 45, wherein the step of generating the modulated data for the converting step further comprises mixing the modulated data from the look-up table with the modulated data generated at the step of gamma-correcting the second data.

* * * * *